(12) United States Patent
Mochizuki et al.

(10) Patent No.: US 7,436,575 B2
(45) Date of Patent: Oct. 14, 2008

(54) SMALL THIN FILM MOVABLE ELEMENT, SMALL THIN FILM MOVABLE ELEMENT ARRAY AND METHOD OF DRIVING SMALL THIN FILM MOVABLE ELEMENT ARRAY

(75) Inventors: Fumihiko Mochizuki, Kanagawa (JP); Shinya Ogikubo, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 11/492,757

(22) Filed: Jul. 26, 2006

(65) Prior Publication Data

US 2007/0024951 A1 Feb. 1, 2007

(30) Foreign Application Priority Data

Jul. 26, 2005 (JP) .......................... P2005-215925

(51) Int. Cl.
*G02B 26/00* (2006.01)
*G09G 3/34* (2006.01)
(52) U.S. Cl. .................. 359/292; 359/291; 359/295; 345/84
(58) Field of Classification Search ................ 359/223, 359/224, 290, 291, 292, 295, 872; 345/85
See application file for complete search history.

(56) References Cited

U.S. PATENT DOCUMENTS 7,075,693 B2 * 7/2006 Ljungblad .................. 359/237

2003/0028360 A1 * 2/2003 Bochobza-Degani et al. ... 703/2
2007/0258124 A1 * 11/2007 Chen et al. .................. 359/245
2008/0074728 A1 * 3/2008 Ogikubo et al. ............. 359/292

FOREIGN PATENT DOCUMENTS

JP 2-7014 A 1/1990
JP 8-334709 A 12/1996

* cited by examiner

*Primary Examiner*—David N Spector
(74) *Attorney, Agent, or Firm*—Sughrue Mion, PLLC

(57) ABSTRACT

A small thin film movable element comprises; a movable portion supported elastically deformably and having a movable electrode at at least a portion of the movable portion; and a fixed electrode arranged to be opposed to the movable portion, wherein the movable portion is displaced by an electrostatic force in accordance with a voltage applied to the movable electrode and the fixed electrode, and wherein the voltage applied in displacing the movable portion falls in a range equal to or lower than a static pull-in voltage for bringing the movable portion into contact with a side of the fixed electrode against a resistance force generated in accordance with an amount of displacing the movable portion and equal to or higher than a minimum dynamic pull-in voltage for bringing the movable portion into contact with the side of the fixed electrode by being compounded with an inertia force generated in accordance with an operation of the movable portion.

7 Claims, 23 Drawing Sheets

A-A SECTION

B-B SECTION

C-C SECTION

D-D SECTION

D-D SECTION

E-E SECTION

E-E SECTION

SMALL THIN FILM MOVABLE ELEMENT, SMALL THIN FILM MOVABLE ELEMENT ARRAY AND METHOD OF DRIVING SMALL THIN FILM MOVABLE ELEMENT ARRAY

BACKGROUND OF THE INVENTION

1. Field of the Invention

The present invention relates to a small thin film movable element and a small thin film movable element array as well as a method of driving a small thin film movable element array for displacing a movable portion by an electrostatic force in according with a voltage applied to a movable electrode and a fixed electrode, which is preferably used in, for example, optical communication, an exposing apparatus, a projector, an optical switch, a scanner, an RF switch, an actuator, a multiplexor or the like.

2. Description of the Related Art

In recent years, by rapid progress of an MEMS technology (HEMS; Micro-Electro Mechanical Systems), there has been intensively carried out development of a small thin film movable element for electrically displacing/moving a small thin film of μm order. As the small thin film movable element, there are, for example, a digital micromirror device (DMD) for deflecting light by inclining a micromirror, an optical switch for switching an optical path and the like. In a field of an optical information processing, DMD is provided with a wide use of a projecting display, a video monitor, a graphic monitor, a television set and electrophotography printing and the like. Further, application of an optical switch is expected in optical communication, optical interconnection (a signal connection technology by light such as an intercoupling network by parallel computers), an optical information processing (information processing by optical operation) and the like.

A small thin film movable element generally includes a movable portion which is supported elastically displaceably and is displaced bi-directionally, and the movable portion mainly deals with switching operation. Therefore, a control of braking a movable portion becomes particularly important in carrying out excellent switching operation.

For example, a micromirror apparatus disclosed in JP-A-8-334709 is constructed by a constitution of applying a voltage to one electrode of a pair of drive electrodes, and rotating a movable portion having a mirror arranged between the electrodes by hinge connection by an electrostatic attractive force in accordance with a potential difference and an electrostatic capacitance between the movable portion and the drive electrode.

Further, according to a method of controlling to switch an optical switch disclosed in JP-A-2-7014, in an optical switch including a vibrating member displaced making a control voltage ON/OFF, and an element of reflecting or cutting propagated light by displacing the vibrating member at a front end of the vibrating member, before making the control voltage ON, a first preliminary voltage pulse shorter than a period of a natural vibration of the vibrating member is applied to the vibrating member, and after making the control voltage OFF, a second preliminary voltage pulse shorter than the period of the natural frequency of the vibrating member is applied to the vibrating member.

Generally, according to an optical switch, when a vibrating member is displaced by making a control voltage ON/OFF, a phenomenon referred to as chattering is brought about. The chattering is a phenomenon in which after making the control voltage ON or OFF, the vibrating member is not immediately changed by an amount of a displacement in correspondence with the control voltage but is displaced finally by the amount of the displacement in correspondence with the control voltage while carrying out a large attenuating vibration. Therefore, the reposes a problem that until the vibration is attenuated, and an optical output becomes a constant level, an optical path is not switched, and a speed of switching the optical switch is restricted. In contrast thereto, according to the method of controlling to switch the optical switch by the background art, by applying the preliminary voltage pluses shorter than the period of the natural vibration of the vibrating member before making the control voltage ON and after making the control voltage OFF, the chattering is controlled, and the speed of switching the optical switch is increased.

However, according to the micromirror apparatus disclosed in JP-A-8-334709, the voltage is applied to one of the contact electrodes, the electrostatic attractive force in accordance with the potential difference between the movable portion and the drive electrode and the electrostatic capacitance is generated and the movable portion is rotated. Therefore, as shown by FIG. 32A, immediately after the micromirror is transited to a contact position by applying a voltage Va and is grounded at the contact position, a vibration is produced by receiving a repulsive force from a contact member. Further, when the vibration is produced, in a case in which light constitutes a control medium, a fluctuation is brought about. Therefore, even a small thin film movable element having first rise by an electrostatic operation needs to await for converging the vibration, and as a result, there poses a problem of retarding an operational speed. Further, even when the micromirror is constituted by a noncontact structure in which the micromirror is not grounded to the contact position, as shown by FIG. 32B, by bringing about overshoot exceeding a desired rotational angle (converging position), time is required until converging the vibration. The vibration or the overshoot hampers high speed formation of a switching operation of the small thin film movable element.

Further, according to the method of controlling to switch the optical switch disclosed in JP-A-2-7014, before making the control voltage ON/OFF, the first preliminary voltage pulse, the second preliminary voltage pulse are applied to the vibrating member, the electrostatic force is operated in a single direction by one movable portion electrode and one fixed electrode, and vibration in driving the movable portion is restrained by a balance of forces of an elastic force and an inertia force of a movable support portion, the electrostatic force (potential difference) only in a forward direction operated in a transition direction of the movable portion is changed and therefore, there poses a problem that a vibration retraining effect is inconsiderable. Generally, in an optical switch for optical communication, different from DMD, much time is taken until converging free vibration since the optical switch is positioned by an arbitrary angle. Further, although high control accuracy is requested in order to reflect optical information of laser light or the like to a fiber on an emitting side to be incident thereon, the vibration of the movable portion (mirror portion) constitutes a cause of noise as the chattering. In this way, particularly in the case of the optical switch, an influence of the vibration is larger than that of DMD to pose a serious problem.

Further, in the small thin film movable element, there is an RF switch in which a movable portion includes a shortcircuit contact and an RF (high frequency) signal is connected and switched by opening/closing an input terminal and an output terminal in which the shortcircuit contact of the movable portion is provided at a board. Although in the RF switch, when a speed of operating the movable portion is several tens sec, the movable portion is not bounded, when the speed becomes about 5 μsec, the movable portion is bounded. Further, when the movable portion is bounded, chattering similar to the above-described is brought about to constitute a cause of bringing about a failure in operation. Therefore, there is requested an RF switch capable of carrying out smaller and firmer operation in high speed.

SUMMARY OF THE INVENTION

The invention has been carried out in view of the above-described situation and it is an object thereof to provide a small thin film movable element and a small thin film movable element array as well as a method of driving a small thin film movable element array capable of considerably shortening a time period until converging a vibration by reducing the vibration generated at pull-in to thereby achieve high speed formation of an operation of the small thin film movable element.

The above-described object according to the invention is achieved by constitutions shown below.

(1) A small thin film movable element comprising: a movable portion supported elastically deformably and having a movable electrode at at least a portion of the movable portion; and a fixed electrode arranged to be opposed to the movable portion, wherein the movable portion is displaced by an electrostatic force in accordance with a voltage applied to the movable electrode and the fixed electrode, and wherein the voltage applied in displacing the movable portion falls in a range equal to or lower than a static pull-in voltage for bringing the movable portion into contact with a side of the fixed electrode against a resistance force generated in accordance with an amount of displacing the movable portion and equal to or higher than a minimum dynamic pull-in voltage for bringing the movable portion into contact with the side of the fixed electrode by being compounded with an inertia force generated in accordance with an operation of the movable portion.

According to the small thin film movable element, an excessive electrostatic force produced by applying a voltage larger than the static pull-in voltage is not generated, further, a deficiency in the electrostatic force produced by applying a voltage smaller than the minimum dynamic pull-in voltage is not brought about, and a necessary minimum electrostatic force is operated to the movable portion. Thereby, a vibration by an impact produced when the movable portion of the background art reaches a finally displaced position by a large speed can be restrained. Therefore, a vibration converging time period can be nullified or considerably shortened while making the structure stay as in the background art.

(2) The small thin film movable element according to (1), further comprising a board to which the fixed electrode is provided, wherein the movable electrode is provided to the movable portion in a shape of a thin film, the movable electrode being supported by the board by interposing a gap therebetween, and the movable portion is operated to be proximate to and remote from the board substantially in parallel with the board.

According to the small thin film movable element, a so-to-speak parallel flat plate type element is constituted by the movable portion and the board, when the voltage is applied to the movable electrode and the fixed electrode, the movable portion is moved in a direction of being proximate to the board in parallel therewith by the electrostatic force and is brought into contact with the board at the finally displaced position. At this occasion, the excessive electrostatic force is not generated, the vibration of the movable portion by the impact is restrained, and the movable portion can be displaced at high speed by nullifying or considerably shortening the vibration converging time period.

(3) The small thin film movable element according to (1), further comprising a board to which the fixed electrode is provided, wherein the movable electrode is provided to the movable portion in a shape of a thin film, the movable portion being supported by the board by interposing a gap therebetween and by way of a support portion, and the movable portion is pivoted centering on the support portion.

According to the small thin film movable element, an upper face of the board is provided with a pair of the fixed electrodes centering on the support portion and the movable portion is provided with the movable electrode. By supplying the voltage to the pair of fixed electrodes, the movable electrode, the movable portion is pivoted to displace centering on the support portion by the electrostatic force and is brought into contact with the board at the finally displaced position. At this occasion, the excessive electrostatic force is not generated, the vibration of the movable portion by the impact is restrained, and the movable portion can be displaced at high speed by nullifying or considerably shortening the vibration converging time period.

(4) The small thin film movable element according to any one of (1) through (3), wherein the movable portion further comprises a reflecting face, and light incident on the reflecting face of the movable portion is modulated.

According to the small thin film movable element, when the voltage is applied to the fixed electrode, the movable portion, the movable portion is pivoted to displace, and a direction of reflecting light incident on the reflecting face of the movable portion is deflected. At this occasion, the excessive electrostatic force is not generated, the vibration of the movable portion by the impact is restrained, the movable portion can be displaced at high speed by nullifying or considerably shortening the vibration converging time period, as a result, light can be modulated at high speed.

(5) The small thin film movable element according to any one of (1) through (3), further comprising a board to which the fixed electrode is provided, the board comprising an input terminal and an output terminal, wherein the movable portion further comprises a shortcircuit contact, and the shortcircuit contact of the movable portion connects and switches a high frequency signal by opening and closing the input terminal and the output terminal provided at the board.

According to the small thin film movable element, when the voltage is applied to the movable electrode, the fixed electrode, the movable portion is displaced by the electrostatic force, the shortcircuit contact of the movable portion is simultaneously brought into contact with the input terminal and the output terminal at the finally displaced position, and the input terminal and the output terminal are closed. At this occasion, the excessive electrostatic force is not generated, the vibration of the movable portion by the impact is restrained, the movable portion can be operated at high speed by nullifying or considerably shortening the vibration converging time period, as a result, an RF (high frequency) signal can be connected at high speed and switched at high speed.

(6) A small thin film movable element array comprising small thin film movable elements which are one-dimensionally or two-dimensionally aligned, each of the small thin film movable elements being according to the small thin film movable element according to any one of (1) through (5).

According to the small thin film movable element array, the individual small thin film movable elements are operated by a necessary minimum electrostatic force, and a total of the array can be operated at high speed by reducing the vibration. Further, although high accuracy is requested in, for example, an optical switch array for optical communication and therefore, an operational error caused by a variation in the individual elements needs to be corrected, according to the small thin film movable element array, voltages applied to the individual small thin film movable elements can be changed in correspondence with the correction.

(7) A method of driving a small thin film movable element array according to (6), the method comprising: attracting all of the movable portions of the aligned small thin film movable elements uniformly to the fixed electrodes by the electrostatic forces in accordance with the voltages; and arbitrarily operating the individual small thin film movable elements.

According to the method of driving a small thin film movable element array, a variation in displacements of the movable portions by the individual difference of the individual elements produced when the voltage is not applied can be removed. Thereby, the movable portions can uniformly be controlled from a state without the variation.

DETAILED DESCRIPTION OF THE INVENTION

Figure 1A:
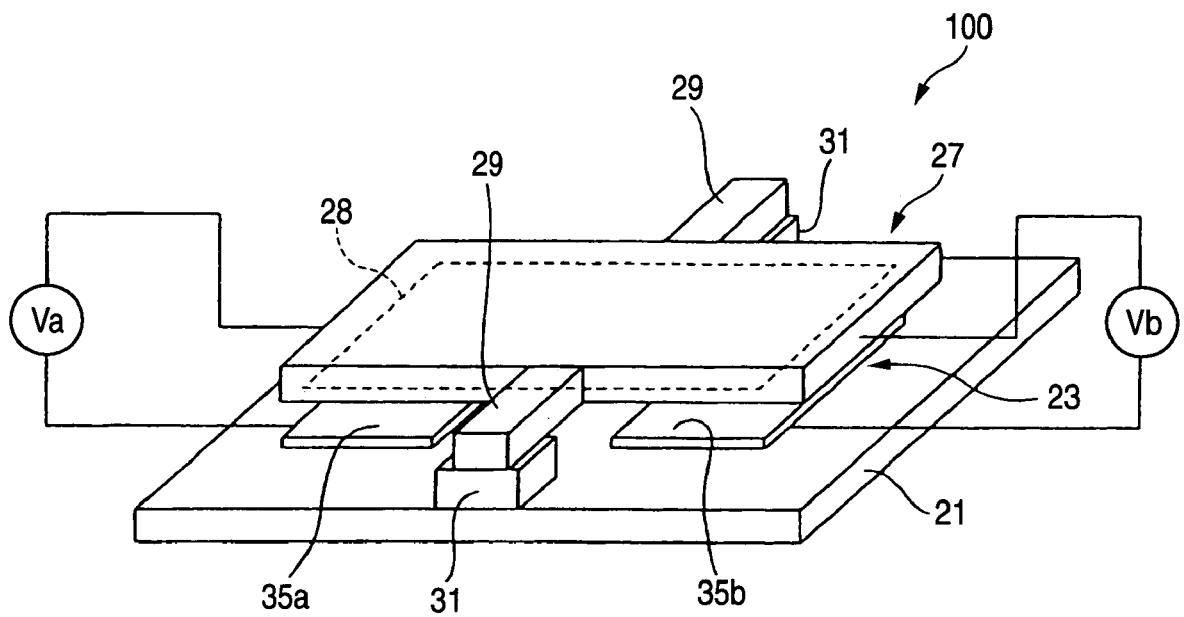
FIGS. 1A and 1B illustrate conceptual views of a first embodiment of a small thin film movable element according to the invention.

According to the small thin film movable element according to the invention, in the small thin film movable element for displacing the movable portion by the electrostatic force in accordance with the voltage applied to the movable electrode and the fixed electrode, the voltage applied to the movable electrode and the fixed electrode falls in the range equal to or lower than the static pull-in voltage and equal to or larger than the minimum dynamic pull-in voltage and therefore, the excessive electrostatic force produced by applying the voltage larger than the static pull-in voltage is not generated, and the necessary minimum electrostatic force can be operated to the movable portion. Therefore, the vibration generated in pull-in can be reduced while making the structure stay as in the background art. As a result, the small thin film movable element can be operated at high speed by considerably shortening the time period until converging the vibration.

According to the small thin film movable element array according to the invention, the small thin film movable element array is one-dimensionally or two-dimensionally aligned with the small thin film movable elements according to any one of claim 1 through claim 5 and therefore, a total of the array can be operated at high speed by reducing the vibration by operating the individual small thin film movable elements by the necessary minimum electrostatic force. Thereby, for example, a photo sensitive member can be exposed at high speed, or a display of a projector having a larger number of pixels or the like can be carried out. Further, although the high accuracy is requested in an optical switch array for optical communication and therefore, an operational error caused by a variation in the individual elements needs to be corrected, according to the small thin film movable element array, by changing voltages applied to the individual small thin film movable elements in correspondence with the correction, the operational error can easily be corrected.

According to the method of driving the small thin film movable element array according to the invention, after uniformly attracting all of the movable portions of the aligned small thin film movable elements by the electrostatic forces in accordance with the voltage, the individual small thin film movable elements are arbitrarily operated and therefore, a variation in displacements of the movable portions by the individual difference of the individual elements brought about when the voltage is not applied can be removed and the movable portions can uniformly be controlled from a state without the variation. As a result, an operational error of the individual small thin film movable elements can be nullified and all of the small thin film movable elements can uniformly be operated.

A detailed explanation will be given of a preferable embodiment of a small thin film movable element and a small thin film movable element array as well as a method of driving a small thin film movable element array according to the invention in reference to the drawings as follows.

Figure 1B:
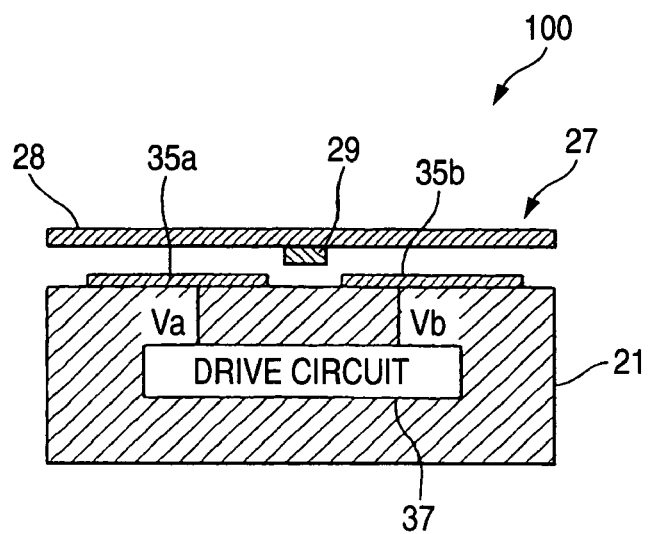
Figure 2A:
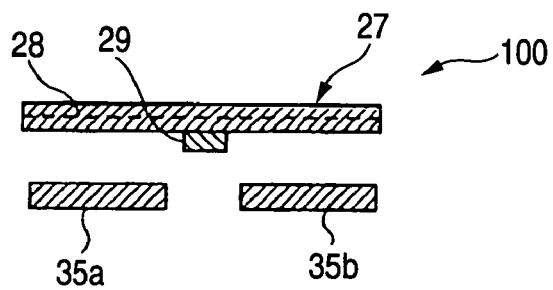
FIGS. 2A to 2C illustrate explanatory views of operation showing an operational procedure when a static pull-in voltage is applied to the small thin film movable element shown in FIGS. 1A and 1B.
Figure 2B:
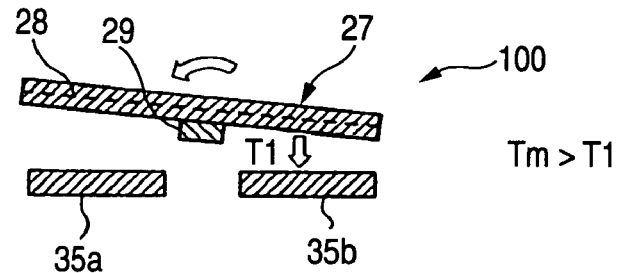
Figure 2C:
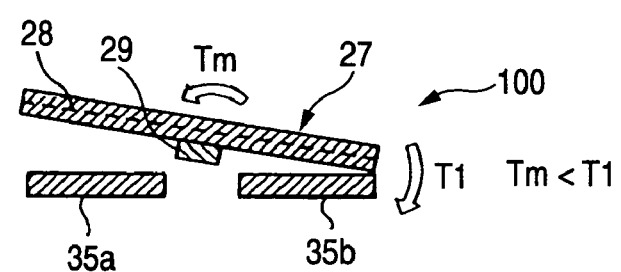
Figure 3:
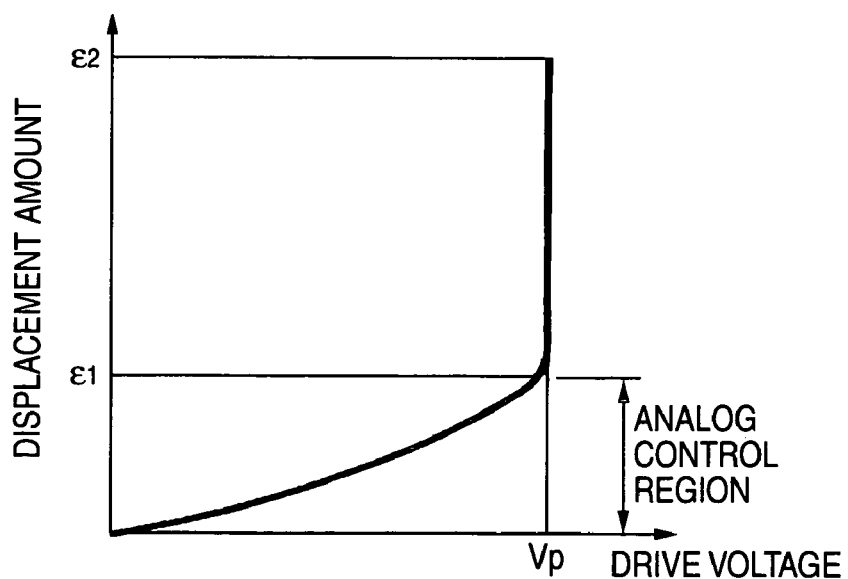
FIG. 3 is an explanatory diagram showing a correlation between a displacement amount and a drive voltage operated to a movable portion when a static pull-in voltage is applied.
Figure 4A:
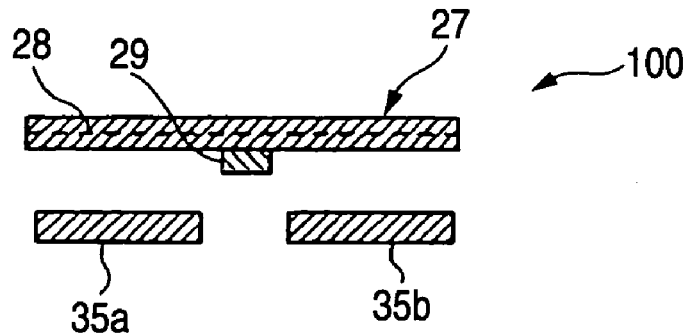
FIGS. 4A to 4C illustrate explanatory views of operation showing an operational procedure when a dynamic pull-in voltage is applied to the small thin film movable element shown in FIGS. 1A and 1B.
Figure 4B:
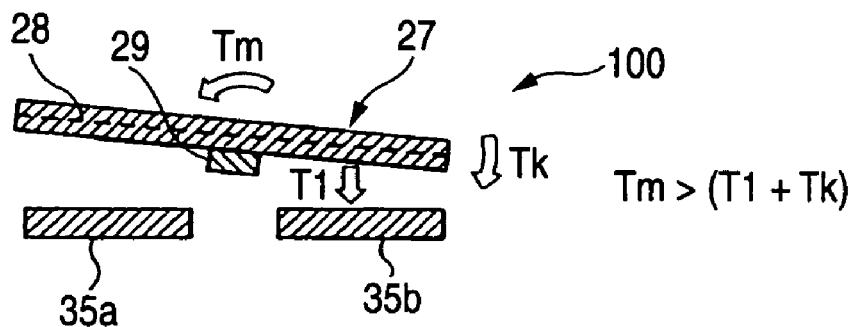
Figure 4C:
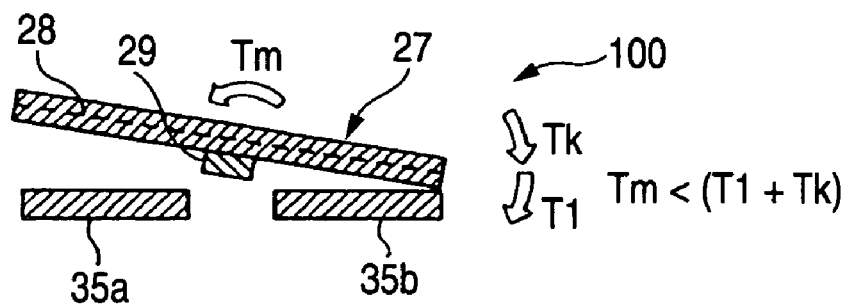

FIGS. 1A and 1B illustrate conceptual views showing a first embodiment of a small thin film movable element according to the invention, FIGS. 2A to 2C illustrate explanatory views of operation showing an operational procedure in applying a static pull-in voltage of the small thin film movable element shown in FIG. 1, FIG. 3 is an explanatory view showing a correlation between a displacement amount and a drive voltage operated to a movable portion in applying the static pull-in voltage, and FIGS. 4A to 4C illustrate explanatory views of operation showing an operational procedure in applying a dynamic pull-in voltage of the small thin film movable element shown in FIG. 1.

A small thin film movable element 100 according to the embodiment includes a movable portion 27 in a shape of a small piece arranged in parallel with a board 21 by way of a gap 23, hinges 29, 29 constituting support portions extended from both edge portions of the movable portion 27, and spacers 31, 31 for supporting the movable portion 27 by the board 21 by way of the hinges 29, 29 as basic constituent elements. By such a constitution, the movable portion 27 can be displaced rotationally by twisting the hinges 29, 29.

According to the small thin film movable element 100, an upper face of the movable portion 27 constitutes a light reflecting portion (micromirror portion). Otherwise, the small thin film movable element according to the invention can switch a sound wave, a fluid, a heat ray, or switch an RF signal by pertinently selecting a material of the movable portion 27, or attaching a shortcircuit contact or the like.

According to the embodiment, in reaching a final position of a displacement in a specific direction, the movable portion 27 is bought into contact with the board 21, or a stopping member, not illustrated to be stopped thereby. That is, the small thin film movable element of a contact type is constituted.

An upper face of the board 21 is provided with a first address electrode 35a and a second address electrode 35b constituting fixed electrodes on both sides thereof by centering on the hinges 29, 29. Further, also the movable portion 27 is provided with a movable electrode 28 at a portion thereof. The small thin film movable element 100 is provided with a drive circuit 37 at inside of the board 21, and the drive circuit 37 applies a voltage between the movable portion 27 and the first address electrode 35a and between the movable portion 27 and the second address electrode 35b. The small thin film movable element 100 pivots to displace the movable portion 27 by constituting a center of twist by the hinges 29, 29 by applying the voltage to the first address electrode 35a, the second address electrode 35b, the movable portion 27 as basic operation. That is, a direction of reflecting light is switched by constituting a micromirror portion by the movable portion 27.

According to the small thin film movable element 100, when a potential difference is provided to the first address electrode 35a, the second address electrode 35b relative to the movable portion 27, an electrostatic force is generated between the respective electrodes and the movable portion 27 and a rotational torque is operated centering on the hinges 29, 29. The electrostatic force generated at this occasion depends on a space permittivity, an area of the movable portion 27, an applied voltage, and an interval between the movable portion 27 and the address electrode.

Therefore, when the space permittivity, the are a of the movable portion 27, the interval between the movable portion 27 and the address electrode, and an elastic coefficient of the hinges 29, 29 are constant, the movable portion 27 is made to be able to be displaced in a left and right direction by controlling potentials of the respective electrodes. For example, when Va>Vb, the electrostatic force generated between the first address electrode 35a and the movable portion 27 becomes larger than the electrostatic force generated between the second address electrode 35b and the movable portion 27, and the movable portion 27 is inclined to a left side. Conversely, when Va<Vb, the electrostatic force generated between the second address electrode 35b and the movable portion 27 becomes larger than the electrostatic force generated between the first address electrode 35a and the movable portion 27 and the movable portion 27 is inclined to a right side.

In this way, the movable electrode of the movable portion 27, the first address electrode 35a, the second address electrode 35b constitute a drive source for rotationally displacing the movable portion 27. By constituting a physical operating force applied from the drive source to the movable portion 27 by the electrostatic force, a high speed rotational displacement can be carried out.

Further, the physical operating force operated to the movable portion 27 may be a physical operating force other than the electrostatic force. As other physical operating force, for example, a piezoelectric effect or an electromagnetic force can be pointed out. In this case, as the drive source, a piezoelectric type actuator using a piezoelectric element, or an electromagnetic type actuator using a magnet and a coil can be adopted.

In this way, the small thin film movable element 100 includes the movable portion 27 displaced bidirectionally, and the movable portion 27 is provided with a switching function. The movable portion 27 is rotationally displaced by the plurality of drive sources (the movable electrode 28 of the movable portion 27, the first address electrode 35a, the second address electrode 35b) for applying the physical operating force. According to the small thin film movable element 100 according to the embodiment, the electrostatic force is operated as the physical operating force. The electrostatic force attracts the movable portion 27 to a side of the board 21 against a gravitational force, an elastic force of the hinges 29, 29. A state in which the movable portion 27 is pivoted to displace by the electrostatic force in this way and a pivoting front end is adsorbed (pulled) to the board 21 is referred to as (pull-in). That is, the movable portion 27 is displaced by the electrostatic force generated by a pull-in voltage by the movable electrode 28, the first address electrode 35a, the second address electrode 35b.

Here, the pull-in voltage can be classified into a static pull-in voltage and a dynamic pull-in voltage. As shown by FIG. 2A, the movable portion 27 is brought into a balanced state when the electrostatic force is not operated. When the electrostatic force is operated and electrostatic torque T1 is smaller than a torque Tm of twisting the hinges 29, 29 (Tm>T1), although the movable portion 27 is inclined as shown by FIG. 2B, the movable portion 27 is not adsorbed thereto. On the other hand, at an instance at which the electrostatic torque T1 becomes larger than the twist torque Tm (Tm<T1), the movable portion 27 is brought into a pull-in state in which the movable portion 27 is adsorbed to the board 21 as shown by FIG. 2C. A voltage at this occasion becomes the static pull-in voltage.

Here, a state before reaching the static pull-in voltage Vp is referred to as an analog control region as shown by FIG. 3 and the voltage cannot be controlled by binary values. That is, the region constitutes a region capable of carrying out a stepless analog control. Further, when a displacement amount in the pull-in state is designated by notation $\epsilon_2$ and the displacement amount when the pull-in voltage is applied is designated by notation $\epsilon_1$, a relationship of $\epsilon_1 \approx \epsilon_2/3$ is established. That is, the movable portion 27 is not adsorbed until ⅓ of the displacement. This is referred to as ⅓ rule.

Therefore, when the static pull-in voltage Vp is applied, the electrostatic torque T1 overcomes the twist torque Tm of the hinges 29, 29 and the movable portion 27 is pulled to the side of the board 21. Therefore, it is not necessary to apply a voltage larger than the static pull-in voltage Vp and when an excessive voltage exceeding the static pull-in voltage Vp is applied, a repulsive force when the movable portion 27 is impacted to the side of the board 21 is increased and a vibration is increased.

Further, when the electrostatic force is not operated as shown by FIG. 4A, the movable portion 27 is brought into the balanced state. When the electrostatic force is operated and a sum of the electrostatic torque T1 and an inertia force Tk is smaller than the torque Tm of twisting the hinges 29, 29 (Tm>T1+Tk), although the movable portion 27 is inclined as shown by FIG. 4B, the movable portion 27 is not adsorbed thereto. On the other hand, at an instance at which the sum of the electrostatic torque T1 and the inertia force Tk exceeds the twist torque Tm (Tm<T1+Tk), the movable portion 27 is brought into the pull-in state in which the movable portion 27 is adsorbed to the board 21 as shown by FIG. 4C. The voltage at this occasion becomes the dynamic pull-in voltage.

The dynamic pull-in voltage is constituted by a value smaller than the static pull-in voltage since the inertia force is taken into consideration. However, the inertia force is changed also by the applied voltage and changed also by a dimension, a mass of the movable portion 27 or the like. That is, the dynamic pull-in voltage is changed also by respective elements, respective driving methods. Further, although the dynamic pull-in is influenced by an air resistance or the like operated as a brake force, an operation thereof is small and therefore, the operation is to a negligible degree.

A relationship of static pull-in voltage>dynamic pull-in voltage is always established between the static pull-in voltage and the dynamic pull-in voltage by an amount of the inertia force Tk. When the drive voltage is smaller than the dynamic pull-in voltage, the movable portion 27 is not pulled to a counter side (board 21 side). Further, when the drive voltage becomes larger than the dynamic pull-in voltage, a vibration in bringing the movable portion 27 into contact with the side of the board 21 is gradually increased in accordance with the increase in the drive voltage. Further, in a stationary state of the movable portion 27, when the drive voltage is equal to or smaller than the static pull-in voltage, the movable portion 27 is not pulled to the side of the board 21.

According to the small thin film movable element 100 according to the embodiment, the voltage for driving to displace the movable portion 27 falls in a range in which the voltage is equal to or smaller than the static pull-in voltage and equal to or larger than a minimum dynamic pull-in voltage.

That is, an equation of static pull-in voltage≧drive voltage≧minimum dynamic pull-in voltage is satisfied. By setting the drive voltage to such a range, the vibration of the movable portion 27 at pull-in is reduced by preventing an electrostatic force more than necessary from being generated. That is, the vibration is prevented from being generated by applying a necessary minimum voltage. This is carried out by adjusting the drive voltage in a displacement region from $\epsilon_1$ to $\epsilon_2$ exceeding the analog control region shown in FIG. 3.

Next, a specific explanation will be given of a sequence of driving the small thin film movable element 100.

Figure 5A:
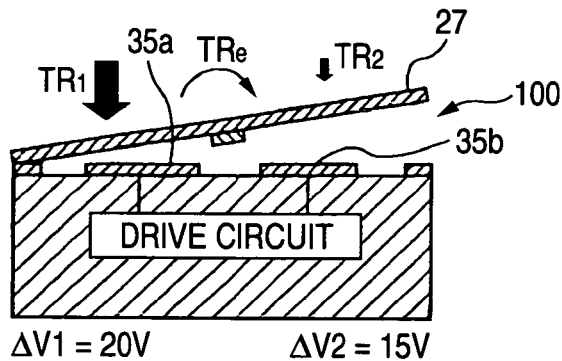
FIGS. 5A to 5E illustrate explanatory views showing a behavior of a movable portion by a driving method according to the invention.
Figure 5B:
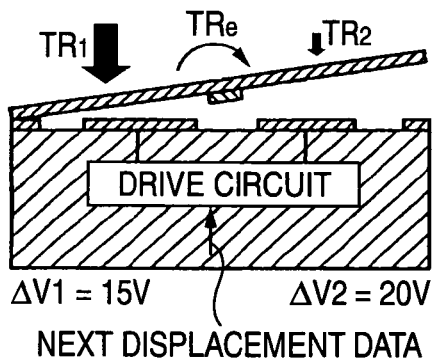
Figure 5C:
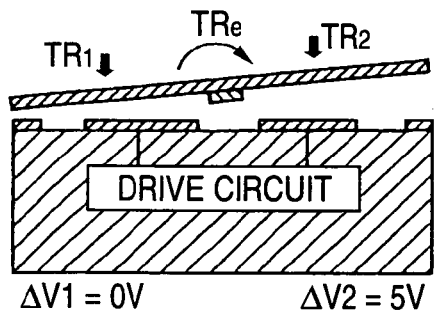
Figure 5D:
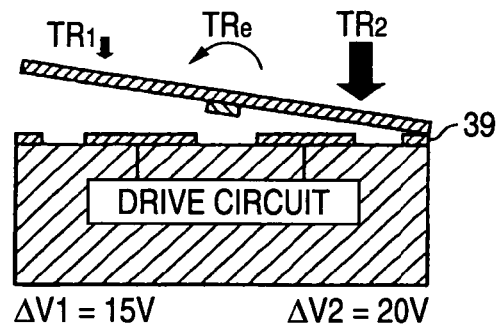
Figure 5E:
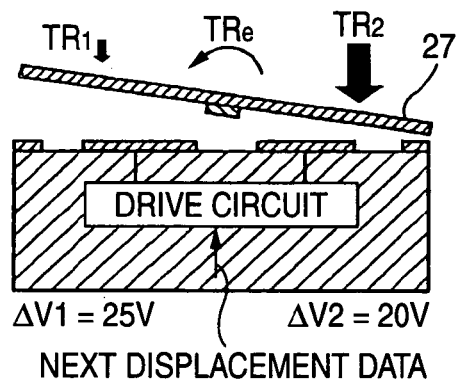
Figure 6:
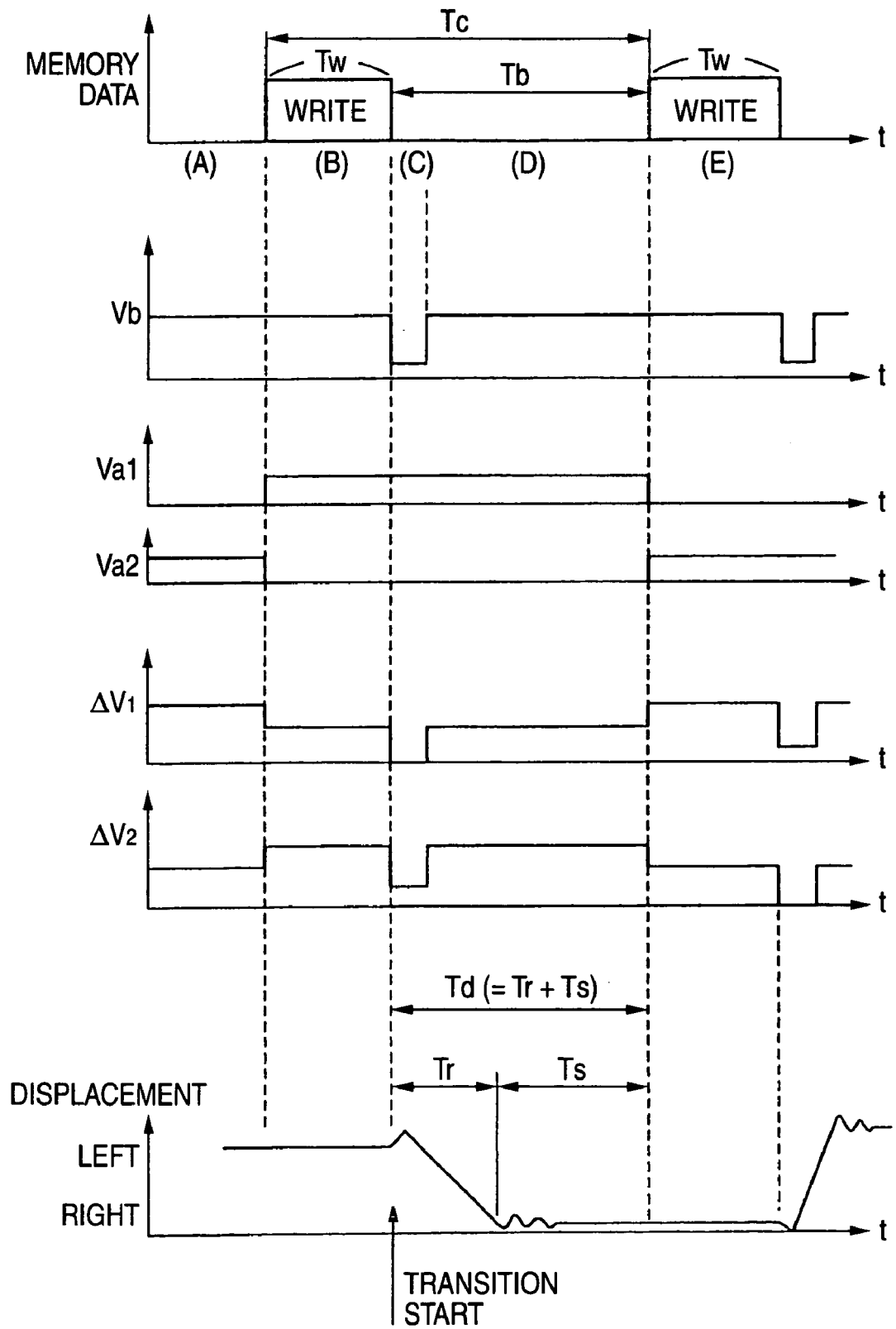
FIG. 6 is an explanatory diagram of a drive sequence of a driving method according to the invention.

FIGS. 5A to 5E illustrate explanatory views showing a behavior of the movable portion by the driving method according to the invention, and FIG. 6 illustrates explanatory diagrams of a drive sequence by the driving method according to the invention.

As shown by FIG. 5A, according to the small thin film movable element 100, for example the movable portion 27 is inclined to a left side (left side of FIG. 5A) in an initial state. At this occasion, the movable electrode 28 is applied with a constant common voltage Vb (+20V) as shown by FIG. 6. On the other hand, an address voltage Va1 (0V) applied to the first address electrode 35a is set to be smaller than an address voltage Va2 (+5V) applied to the second address electrode 35b (Va1<Va2). Therefore, a voltage between electrodes on the left side of the movable portion 27 (|Vb−Va1|=ΔV1=20V) becomes larger than a voltage between electrodes on the right side (|Vb−Va2|=ΔV2=15V) (ΔV1>ΔV2). Thereby, a left-handed electrostatic torque TR1 becomes larger than a sum of a right-handed electrostatic torque TR2 by the electrostatic force and an elastic recovery force TRe of the hinges 29, 29 and the movable portion 27 is inclined to the left side.

Next, as shown by FIG. 5B, FIG. 6, while making the common voltage Vb stays as it is, the voltages supplied to the first address electrode 35a and the second address electrode 35b are reversed (Va1>Va2). That is, a successive displacing signal Tw is written by applying the address voltage Va1 (5V) to the first address electrode 35a and applying the address voltage Va2 (0V) to the second address electrode 35b. At this occasion, although the right side voltage between electrodes becomes larger by constituting (ΔV1=15V)<(ΔV2=20V), the small thin film movable element 100 is maintained in a latched state.

For example, in a drive sequence of transiting the movable portion 27 to be inclined to the right side from the state, first, while making the address voltages to the address electrode 35a, the second address electrode 35b stay as it is (Va1>Va2), only the common voltage Vb is reduced (for example, Vb=5V), as shown by notation (C) position of FIG. 6. Then, the electrostatic force on the left side of the movable portion 27 is nullified (ΔV1=0), a small electrostatic force is operated on the right side (ΔV2=5V), the elastic recovery force of the hinges 29, 29 is added thereto and as shown by FIG. 5C, the left side of the movable portion 27 is floated up to be brought into state of reducing left inclination from being maintained.

Successively, as shown by notation (D) position of FIG. 6, there is carried out a common control of recovering the common voltage Vb to the original constant value (Vb=20V) after reducing the common voltage Vb (for example, Vb=5V). That is, before the movable portion 27 reaches a grounding site 39 on the right side constituting a finally displaced position, an absolute value of the voltage between electrodes between the movable electrode 28 and the second address electrode 35b is reduced (ΔV2=5V). Thereby, a speed immediately before the movable portion 27 reaches the grounding site 39 is decelerated.

Next, when the common voltage Vb is recovered to the original constant value (Vb=20V), the voltage between electrodes on the right side of the movable portion 27 (ΔV2=20V) becomes larger than the voltage between electrodes on the left side (ΔV1=15V), as shown by FIG. 5D, the movable portion 27 is transited to right inclination. When the movable portion 27 is transited to right inclination, by shortening a distance between the movable portion 27 and the second address electrode 35b, the electrostatic force is synergistically increased and at this occasion, the right side is maintained in a state of being grounded to the grounding site 39.

The movable portion 27 receives a repulsive force from the grounding site 39 immediately after grounding the right side to thereby bring about a vibration. Therefore, next writing is carried out after an elapse of switch time Tr and after awaiting for an elapse of vibration converging time Ts. Time (Td=Tr+Ts) from reducing the common voltage Vb to next writing becomes inherent time depending on the small thin film movable element 100. Further, in FIG. 6, notation Tb designates a time period during when preceding writing is finished and succeeding writing is started. Therefore, according to the small thin film movable element 100, one block amount (one line amount) is written by repeating time (drive cycle) Tc=Tw+Tb of a sum of writing time Tw and time Tb finishing preceding writing to starting succeeding writing.

Here, the movable portion 27 does not receive a large repulsive force from the grounding site 39 since the speed is decelerated to a necessary minimum speed when the right side is grounded and can be latched to a state shown in FIG. 5E without bringing about vibration. Under the state, the drive circuit 37 outputs a succeeding displacement signal to the fixed electrode 35 and writes a succeeding displacement signal Tw as shown by Notation (E) position of FIG. 6.

Next, a static pull-in voltage and a dynamic pull-in voltage will be explained in details.

The vibration of the movable portion 27 follows a general equation of motion. Further, a description will be given here centering on a linear motion system to simplify explanation. When a displacing amount is designated by notation x, an equation of motion is represented by Equation (1).

$$m \cdot d^2x/dt^2 + c \cdot dx/dt + k \cdot x = F \quad (1)$$

where;

m: mass, c: viscosity attenuating coefficient, k: elastic modulus, F: external force (electrostatic force).

In a rotational motion system, respective terms of Equation (1) may be conceived as a rotational moment.

(I) Static Pull-In Voltage

The movable portion 27 is not changed over time and therefore, both of an inertia force and a viscosity force can be nullified. In that case, a voltage by which k·x=F in Equation (1) is not established in a range of the displacing amount x is referred to as the static pull-in voltage.

Figure 7:
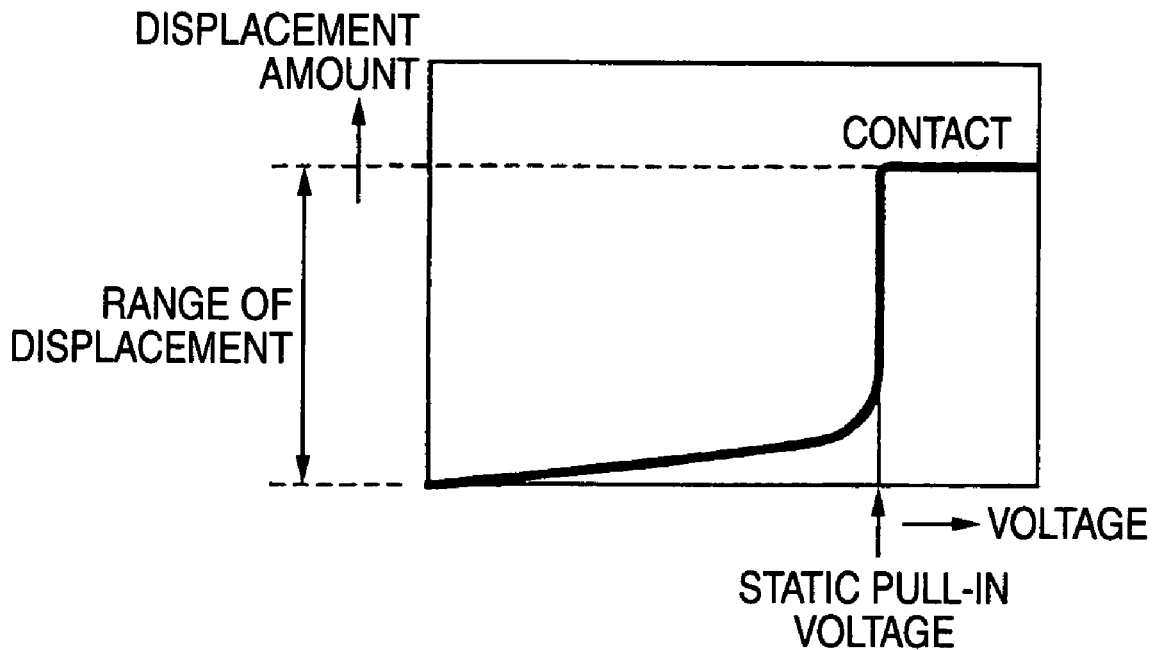
FIG. 7 is a graph conceptually showing a relationship between a voltage and a displacement for explaining a static pull-in voltage.

FIG. 7 is a graph conceptually showing a relationship between the voltage and the displacement for explaining the static pull-in voltage. As shown by FIG. 7, the displacement is gradually increased in accordance with the increase in the voltage and when a certain voltage value is reached, the movable portion 27 is displaced to a maximum displacement position in one motion to be brought into contact with a counter side member. The voltage value becomes the static pull-in voltage.

(II) Dynamic Pull-in Voltage

In the above-described dynamic pull-in voltage, when the movable portion 27 is moved while having a change over time, at a point at which the movable portion 27 reaches the maximum displacement position and the inertia force and the viscosity force are nullified, a voltage at which k·x=F of Equation (1) is not established becomes the lowest voltage (minimum dynamic pull-in voltage) in the dynamic pull-in voltage. That is, the minimum dynamic pull-in voltage is a voltage at which the movable portion 27 carries out the pull-in operation at maximum displacement of the movable portion 27 in which both of the inertia force and the viscosity force are nullified.

Figure 8:
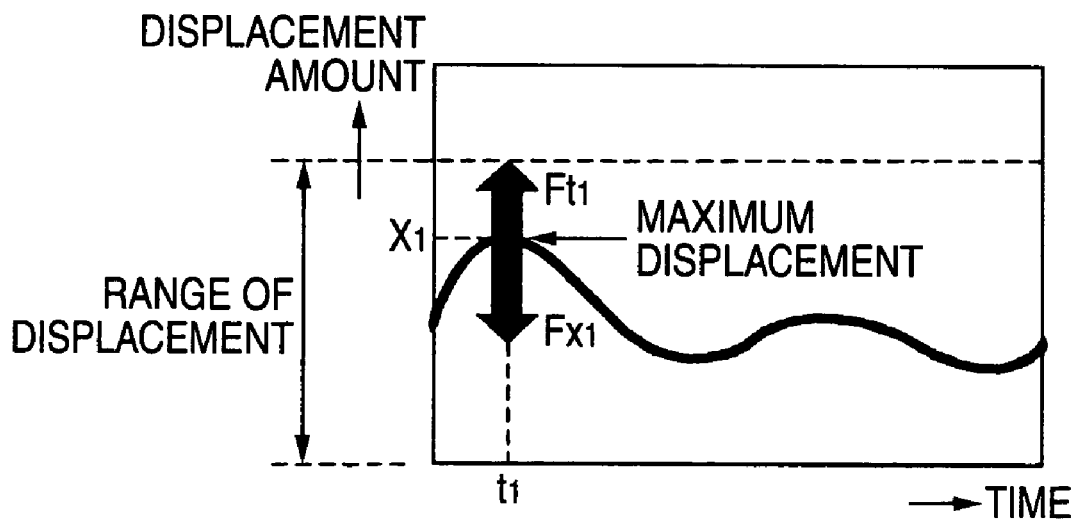
FIG. 8 is a graph conceptually showing a change over time of a displacing amount for explaining a dynamic pull-in voltage.

FIG. 8 is a graph conceptually showing a change over time of the displacing amount for explaining the minimum dynamic pull-in voltage. As shown by FIG. 8, at $t_1$ at which the displacing amount of the movable portion 27 becomes a maximum, both of the inertia force and the viscosity force are nullified. At this occasion, a voltage by which $Ft_1$ directed to a contact position becomes larger than a force $Fx_1$ in a reverse direction becomes a minimum pull-in voltage.

(III) Specific Example by Simulation a) Derivation of Static Pull-In Voltage Vs

The electrostatic force F operated to the movable portion 27 can also be represented by the following equation.

$$F = \tfrac{1}{2} \cdot \{\epsilon_0 \cdot S/(d-x)^2\} \cdot V^2 \quad (2)$$

where, $\epsilon_0$: space permittivity

S: electrode area d: initial gap

V: voltage.

When the electrostatic force F is put as k·x and a variable of Equation (2) is separated, Equation (3) is derived.

$$x \cdot (d-x)^2 = \tfrac{1}{2} \cdot \epsilon_0 \cdot S \cdot V^2 / k \quad (3)$$

Figure 9A:
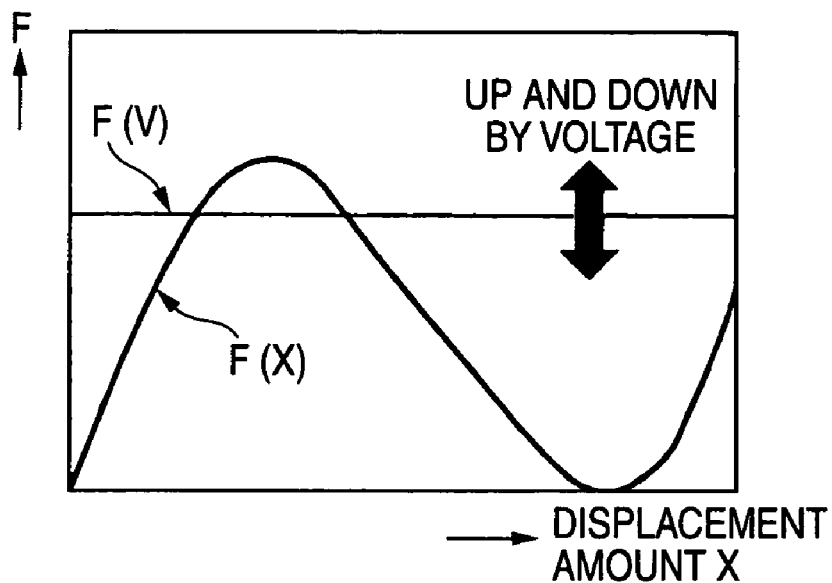
FIGS. 9A and 9B illustrate graphs showing a behavior of a change in an external force F relative to a displacing amount.

Here, when a left hand side of Equation (3) is put as force F (x), a right hand side thereof is put as force F (V) by the voltage and a relationship therebetween is represented, the relationship becomes as shown by FIG. 9A. FIG. 9A is a graph showing a behavior of a change in external force F relative to the displacing amount. According to the force F (V) by the voltage, the absolute value of the force is changed by the voltage value V.

Figure 9B:
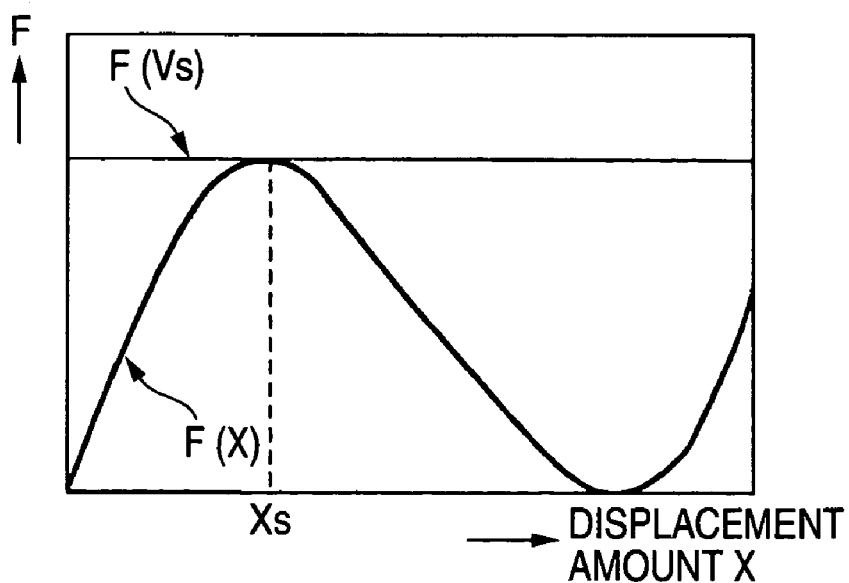

Meanwhile, a displacing amount xs for bringing about the static pull-in is a displacing amount xs satisfying dF (x)/dt=0 and becomes as shown by FIG. 9B. FIG. 9B is a graph when F (V) of FIG. 9A is constituted by a static pull-in voltage Vs.

When the displacing amount xs for bringing about the static pull-in is calculated from Equation (3), $$dF(x)/dt=(x-d)\cdot(3x-d)=0 \qquad (4)$$

From Equation (4), the displacing amount xs for bringing about the static pull-in becomes xs=d/3.

The static pull-in voltage Vs at this occasion is calculated as follows.

$$Vs=\{8\cdot k\cdot d^3/(27\cdot \epsilon_0 \cdot S)\}^{1/2} \qquad (5)$$

b) Derivation of Minimum Dynamic Pull-In Voltage Vd

Here, to simplify calculation, when time t=0, displacing amount x=0 to thereby nullify a displacing amount in the initial state. Further, the term representing viscosity is put as C·dx/dt=0.

Figure 10:
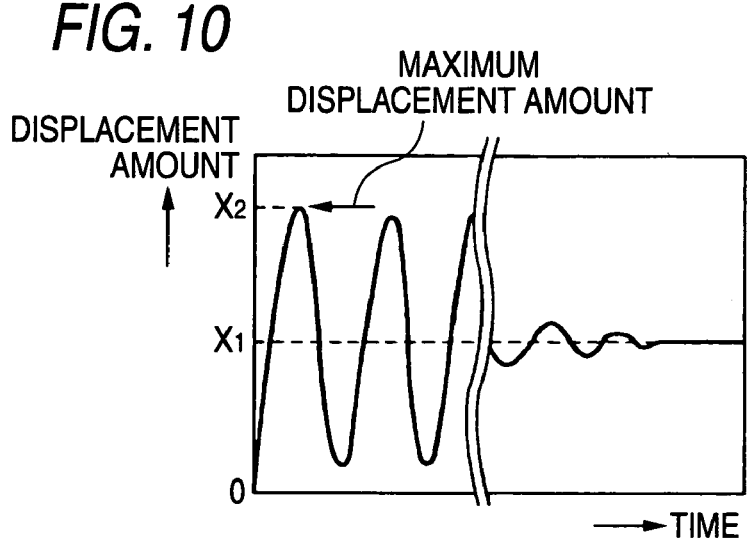
FIG. 10 is a wave form diagram of a vibration of a movable portion when a voltage is applied to the movable portion.
Figure 11:
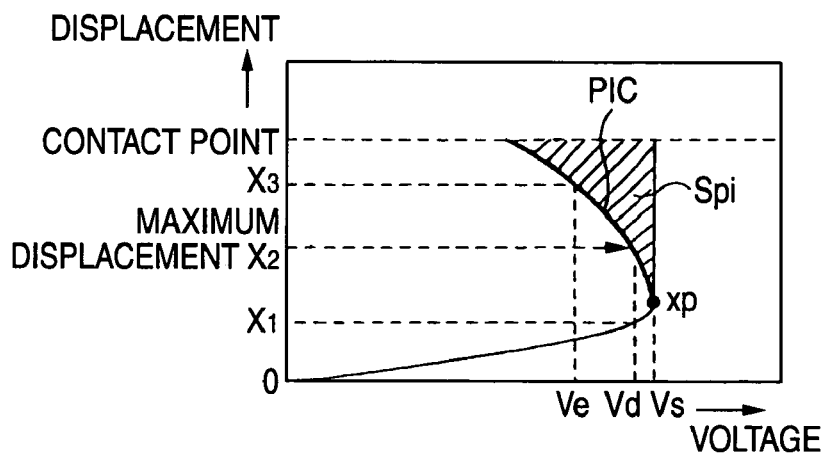
FIG. 11 is a static voltage-displacement correlation diagram.

A vibration waveform of the movable portion when the movable portion 27 is applied with the voltage V (equal to or lower than static pull-in voltage Vs) is shown in FIG. 10 and a correlation between static voltage-displacement is shown in FIG. 11.

Here, notation $x_1$ designates a finally displaced amount and a maximum displacing amount $x_2$ can be put as $x_2=2\cdot x_1$ since the viscosity force is nullified.

As shown by FIG. 11, a region at which the displacement becomes larger than a pull-in curve (PIC curve) is a pull-in region Spi, and an amount of a change for pull-in differs by a voltage applied. Both of the above-described displacing amounts $x_1$, $x_2$ can be conceived to be applied to static voltage-displacement diagram of FIG. 11 since inertia force=viscosity force=null. The minimum dynamic pull-in voltage is a voltage which is brought into pull-in when both of the inertia force and the viscosity force are nullified and at maximum displacement as described above and therefore, a voltage at which the maximum displacement $x_2$ coincides with the PIC curve is the minimum dynamic pull-in voltage.

When the displacement amount $x_1$, the maximum displacement amount $x_2$ are constituted in being converged (time $t \to \infty$), a voltage satisfying Equation (6) through Equation (8) shown below becomes the dynamic pull-in voltage Vd.

$$k\cdot x_1 = \tfrac{1}{2}\cdot\{\epsilon_0 \cdot S/(d-x_1)^2\}\cdot V^2 \qquad (6)$$

$$k\cdot x_2 = \tfrac{1}{2}\cdot\{\epsilon_0 \cdot S/(d-x_2)^2\}\cdot V^2 \qquad (7)$$

$$x_2 = \tfrac{1}{2}\cdot x_1 \qquad (8)$$

In equation (8), the inertia term and the viscosity term of Equation (1) are omitted since influence by viscosity is inconsiderable. $x_1$, $x_2$, Vd are calculated from Equation (6) through Equation (8) as follows.

$$x_1 = (3-\sqrt{2})\cdot d/7 \qquad (9)$$

$$x_2 = 2/(3-\sqrt{2})\cdot d/7 \qquad (10)$$

$$Vd = \{2\cdot k\cdot(3-\sqrt{2})\cdot(4+\sqrt{2})^2\cdot d^3/(7^3\cdot \epsilon_0 \cdot S)\}^{1/2} \qquad (11)$$

where, (11) shows a case of $x_2=2x_1$.

c) Simulation

Here, the static pull-in voltage Vs is calculated by a simulation by using a DMD element in which the movable portion 27 is made to constitute a rotational motion system.

Figure 12:
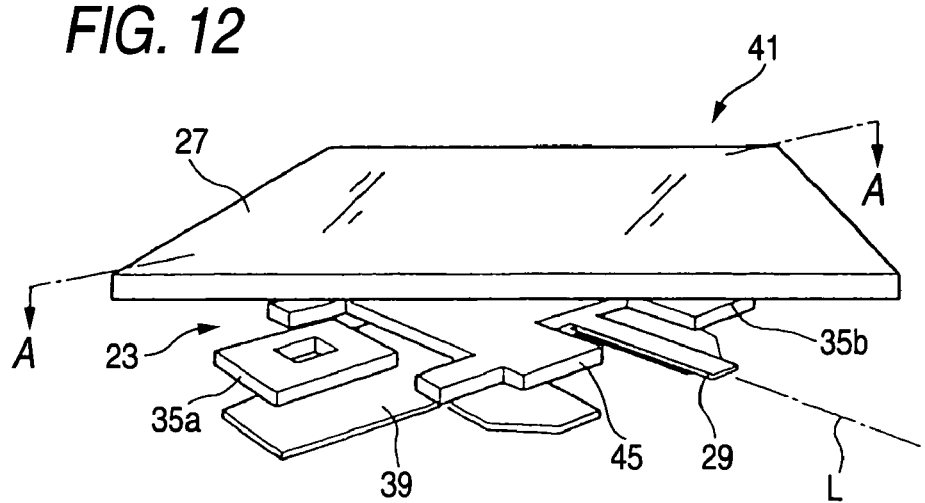
FIG. 12 is an outline view of a DMD element used in a simulation.

FIG. 12 shows an outline view of a DMD element used in the simulation. As shown by FIG. 12, a DMD element 41 comprises the movable portion 27 constituting a mirror, the first address electrode 35a, the second address electrode 35b constituting lower electrodes, the hinge 29, the gap 23 constituting a gap interval, a mirror stay 43, a yoke 45 and the grounding site 39. The movable portion 27 is operated to rotate centering on a rotational axis L.

Figure 13A:
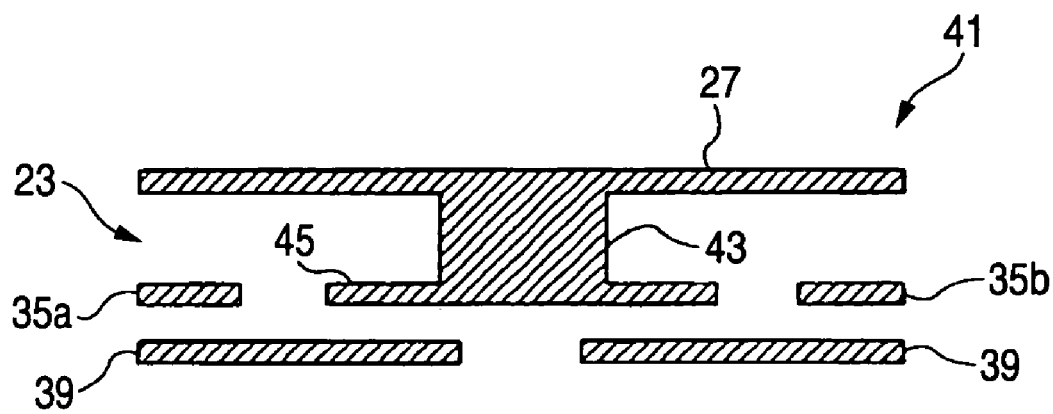
FIGS. 13A and 13B illustrate explanatory views showing an A-A section of FIG. 12 and operation thereof.
Figure 13B:
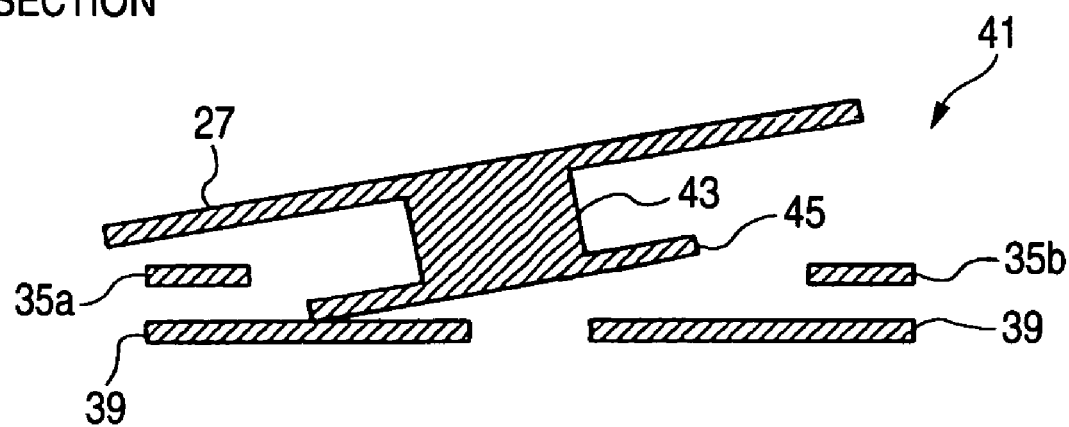

FIGS. 13A and 13B shows an A-A section of FIG. 12 and operation thereof. FIG. 13A shows an initial state in which the movable portion 27 is not inclined and FIG. 13B shows a state in which the movable portion is inclined by generating an electrostatic force between the first address electrode 35a and the movable portion 27.

Figure 14B:
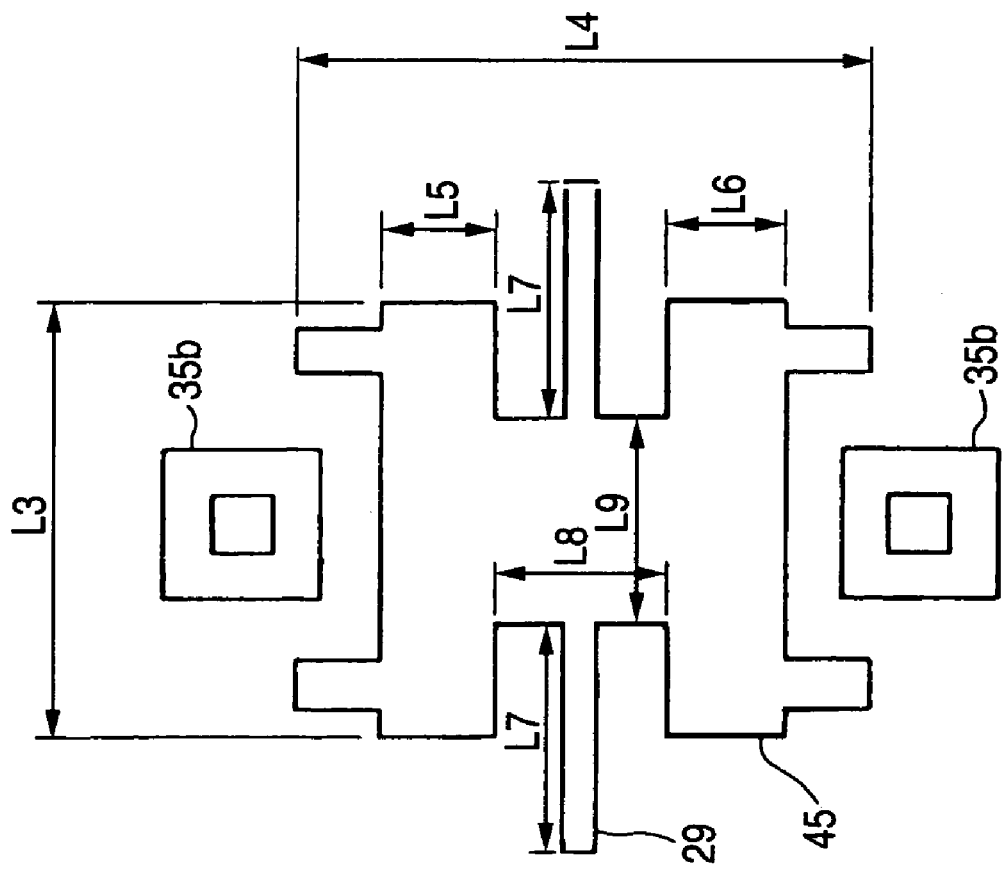
FIGS. 14A and 14B illustrate explanatory views of a dimension of the DMD element used in the simulation.
Figure 14A:
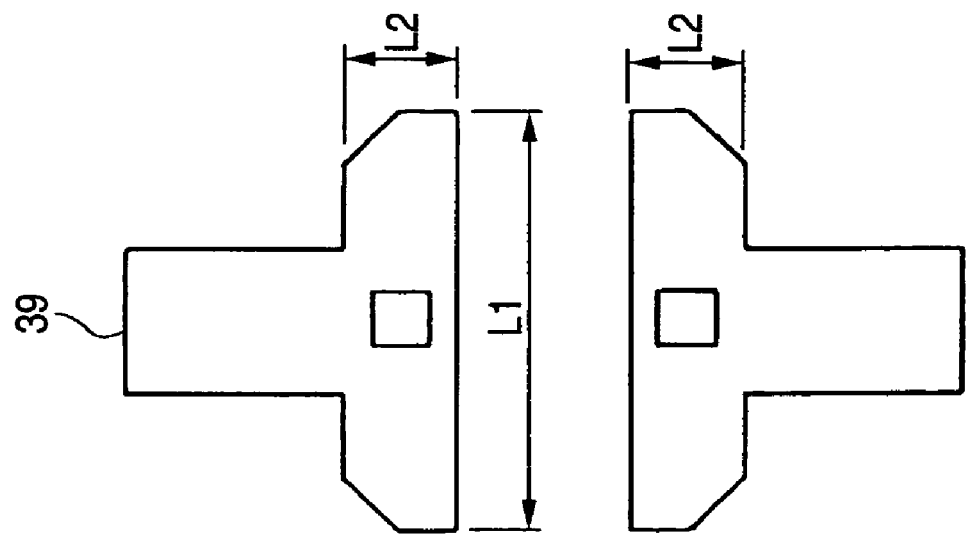

Simulation Condition
main dimension of DMD element
hinge thickness: 0.08 μm
yoke thickness: 0.35 μm
mirror plane dimension: 12.6×12.6 μm
mirror thickness: 0.46 μm
mirror stay height: 2.0 μm
gap interval: 1 μm
Other dimensions L1 through L9 as shown in FIGS. 14A and 14B.

Figure 15:
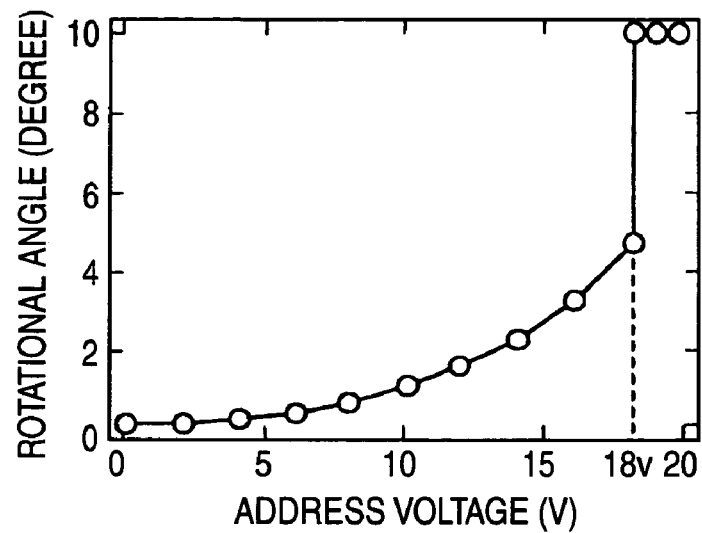
FIG. 15 is a graph showing a result of a simulation of a static pull-in voltage of DMD.

FIG. 15 shows a result of simulation of the static pull-in voltage of DMD.

According thereto, when the address voltage is applied to increase from 0V to every 2V and a rotational angle of the movable portion at that occasion is investigated, before an applied voltage of 18V, the rotational angle is gradually increased in accordance with an increase in the voltage. Further, when the voltage is applied to exceed 18V, the rotational angle is rapidly changed and the movable portion 27 reaches the final displacement position.

The actual DMD element 41 is frequently driven by 23V although depending on the driving method. That is, the DMD element 41 is driven by a voltage equal to or higher than the static pull-in voltage.

Figure 16A:
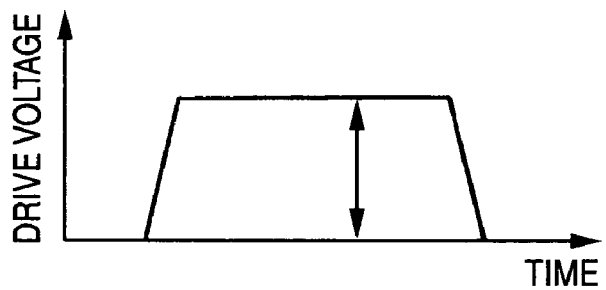
FIGS. 16A and 16B illustrate explanatory diagrams showing an actual drive waveform.
Figure 16B:
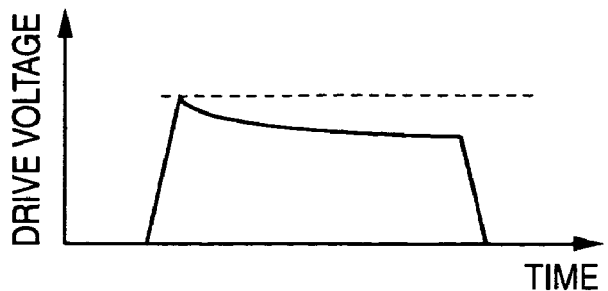

FIG. 16 illustrates an actual drive waveform and in a statically balanced state, as shown by FIG. 16A, a constant drive voltage is constituted, however, when the movable portion 27 is vibrated, as shown by FIG. 16B, the dynamic pull-in voltage becomes dominant in the control and a lower voltage is applied. In the midst of driving, there is a case in which the movable portion 27 repeats movement and in that case, a drive control based on the dynamic pull-in voltage is carried out. That is, a voltage in the midst of driving can be lowered.

Next, an explanation will be given of a result of actually fabricating a small thin film movable element and investigating a correlation between a drive voltage and a displacement.

Figure 17A:
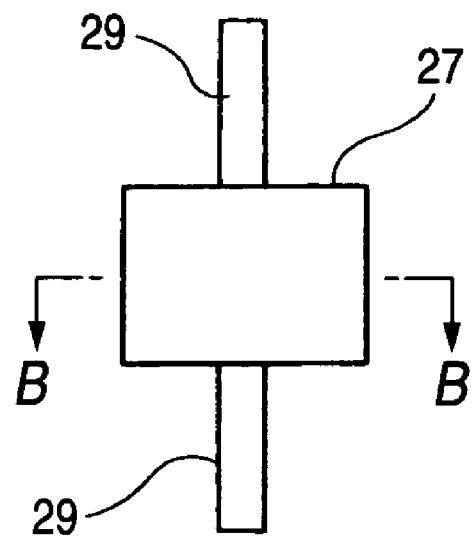
FIG. 17A illustrates an explanatory view showing a trially fabricated movable portion.
Figure 17B:
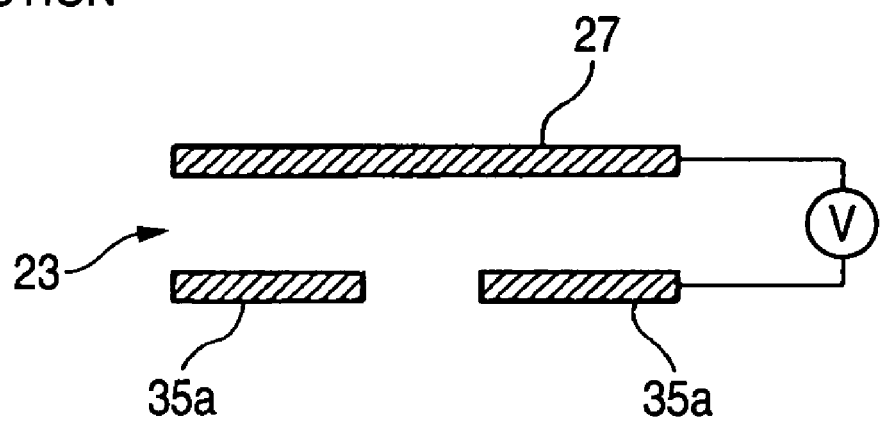
FIG. 17B illustrates an explanatory views showing an electrode constitution.

FIG. 17 illustrates explanatory views showing a trially fabricated movable portion by FIG. 17A and showing an electrode constitution by FIG. 17B, FIGS. 18A to 18C illustrate graphs showing the correlation between the voltage and the displacement for respective voltages. The movable portion 27 used in trial fabrication is constituted by extending the hinges 29, 29 in an orthogonal direction at a center portion of left and right long sides of a thin film in a rectangular shape. The gap 23 is set to about 0.8 μm.

Figure 18A:
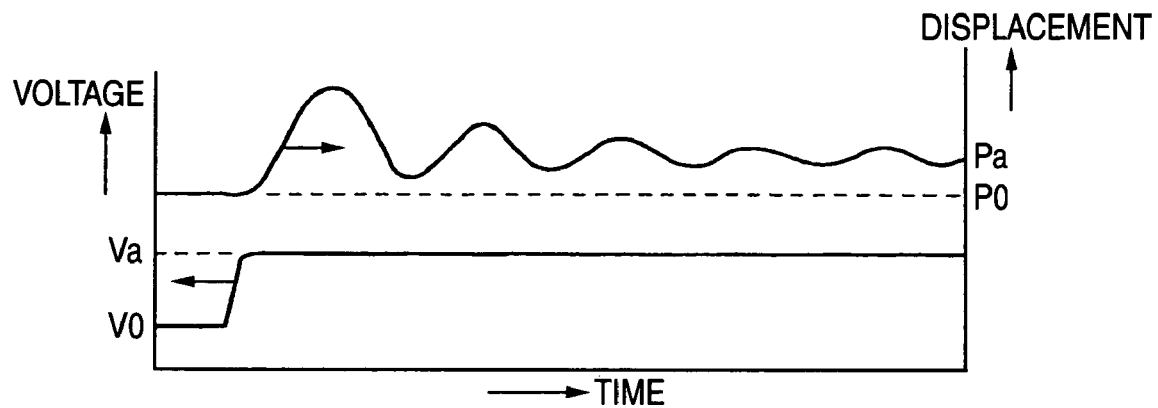
FIGS. 18A to C illustrate graphs showing a correlation between a voltage and a displacement for respective voltages.

As shown by FIG. 18A, when a voltage Va equal to or lower than the minimum dynamic pull-in voltage is applied as the drive voltage, vibration of the movable portion 27 is attenuated to be stopped while staying in a state of not being brought into pull-in.

Figure 18B:
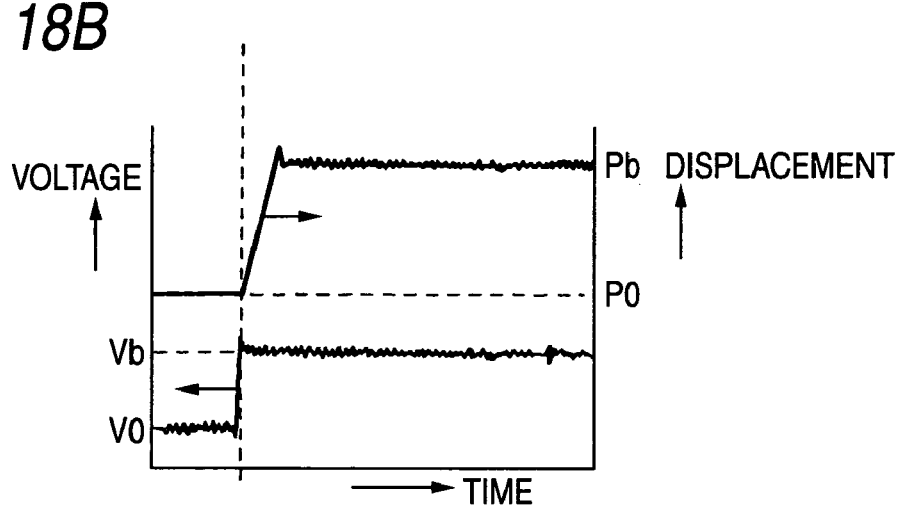

As shown by FIG. 18B, when the voltage Vb slightly exceeding the minimum dynamic pull-in voltage is applied, a small vibration is attenuated to be stopped.

Figure 18C:
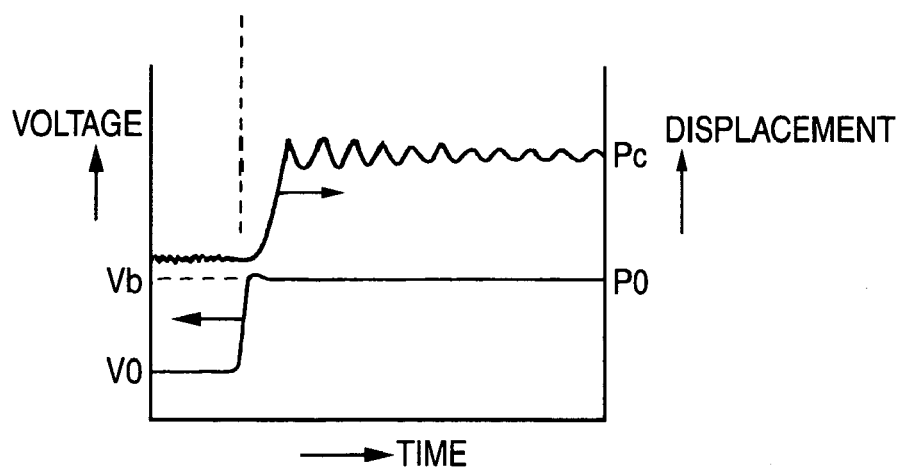

As shown by FIG. 18C, when a voltage Vc equal to or higher than the static pull-in voltage is applied, a large vibration is generated and is stopped after an elapse of attenuation of a long period of time.

Therefore, according to the small thin film movable element 100, in the small thin film movable element 100 for displacing the movable portion 27 by the electrostatic force in accordance with the voltage applied to the movable electrode and the fixed electrode, the applied voltage falls in a range equal to or lower than the static pull-in voltage and equal to or higher than the minimum dynamic pull-in voltage and therefore, the excessive electrostatic force generated by applying the voltage larger than the static pull-in voltage is not generated and the necessary minimum electrostatic force can be operated to the movable portion 27. Therefore, the vibration generated in pull-in can be reduced while making a structure stay as in the background art. As a result, the small thin film movable element 100 can be operated at high speed by considerably shortening a time period until converging the vibration.

Figure 19:
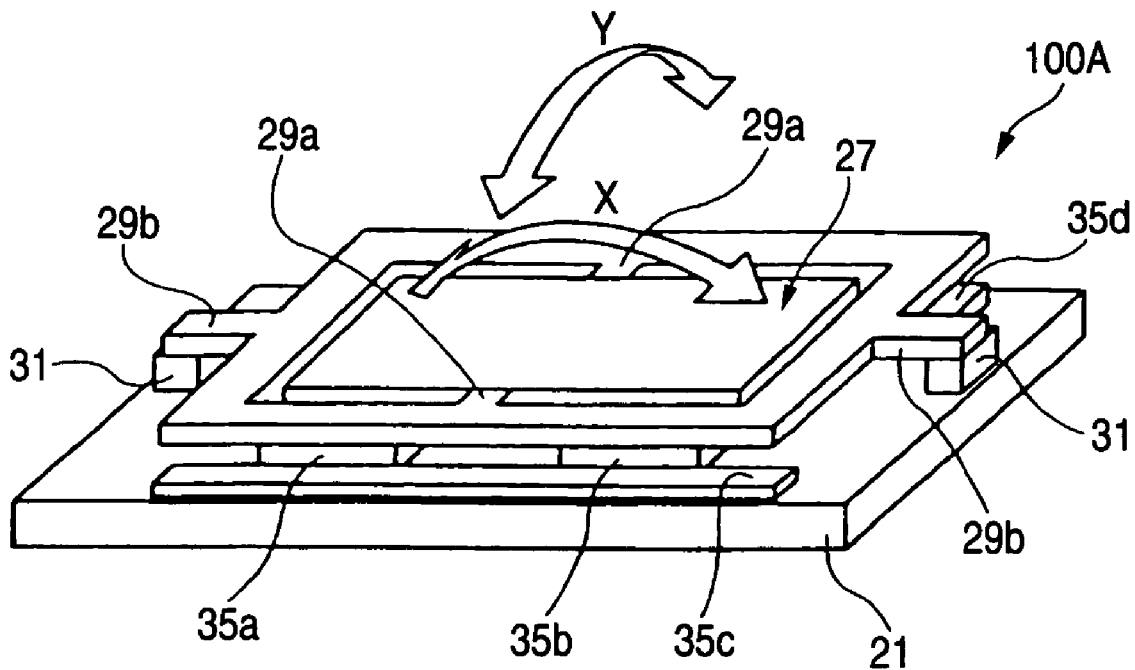
FIG. 19 is a perspective view showing an example of a three-dimensional small thin film movable element having a biaxially pivoted movable portion.

FIG. 19 is a perspective view showing an example of a three-dimensional small thin film movable element having a movable portion pivoted biaxially.

The small thin film movable element 100 may be a biaxial three-dimensional small thin film movable element 100A constituting centers of twist by hinges 29a, 29a, hinges 29b, 29b shown by FIG. 19 other than the monoaxial two-dimensional small thin film movable element constituting the basic constitution and constituting the center of twist by the hinges 29, 29 shown in FIGS. 1A and 1B. In this case, the three-dimensional small thin film movable element 100A is provided with a third address electrode 35c and a fourth address electrode 35d in addition to the first address electrode 35a and the second address electrode 35b. Further, by applying a voltage to the first address electrode 35a, the second address electrode 35b, the movable portion 27, the movable portion 27 is driven in X direction and by applying a voltage to the third address electrode 35c, the fourth address electrode 35d, the movable portion 27, the movable portion 27 is driven in Y direction.

Also in the case of the three-dimensional small thin film movable element 100A, the necessary minimum electrostatic force can be operated to the movable portion 27 and the vibration generated in pull-in can be reduced while making a structure stay as in the background art. As a result, the small thin film movable element 100A can be operated at high speed by considerably shortening the time period until converging the vibration.

Next, a second embodiment of a small thin film movable element according to the invention will be explained.

Figure 20:
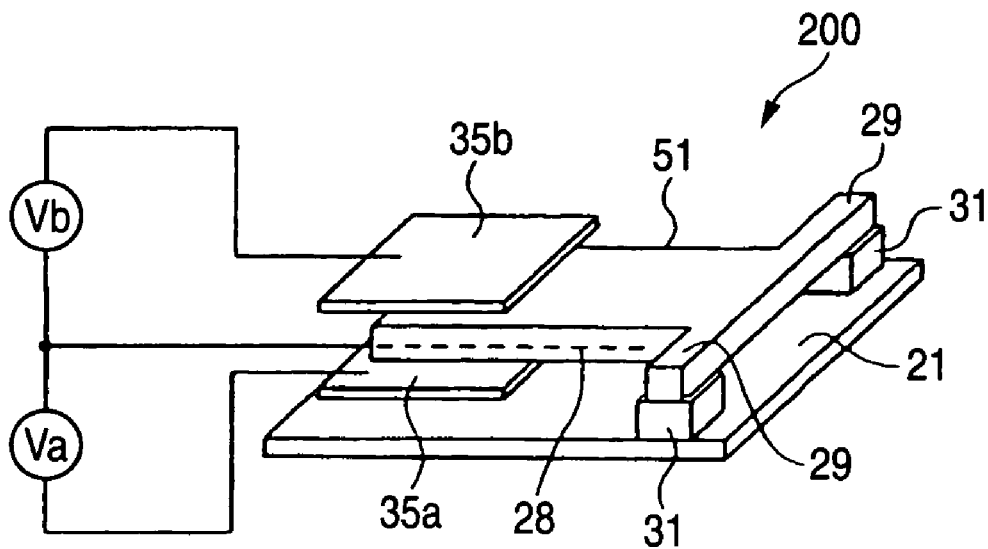
FIG. 20 is a conceptual view showing a third embodiment of a small thin film movable element according to the invention.

FIG. 20 illustrates conceptual views showing a second embodiment of a small thin film movable element according to the invention.

According to a small thin film movable element 200 according to the embodiment, one end of a movable portion 51 is supported to be fixed by the board 21 by way of the hinges 29, 29, the spacer 31, 31. That is, the movable portion 51 is constituted by a shape of a cantilever constituting a free end by other end thereof. Further, the first address electrode 35a is provided on the board 21 to be opposed to the free end of the movable portion 51, and an opposed side of the first address electrode 35a interposing the movable portion 51 is provided with the second address electrode 35b formed at an opposed board, not illustrated.

Also in the small thin film movable element 200 having such a constitution, the voltage Va, Vb applied between the first address electrode 35a and the movable portion 51, or between the second address electrode 35b and the movable portion 51 falls in a range equal to or lower than the static pull-in voltage and equal to or higher than the minimum dynamic pull-in voltage and therefore, the necessary minimum electrostatic force can be operated to the movable portion 51 without generating an excessive electrostatic force produced by applying a voltage larger than the pull-in voltage. Therefore, the vibration generated in pull-in can be reduced. As a result, the small thin film movable element 100 can be operated at high speed by considerably shortening the time period until converging the vibration.

Next, a third embodiment of a small thin film movable element according to the invention will be explained.

Figure 21B:
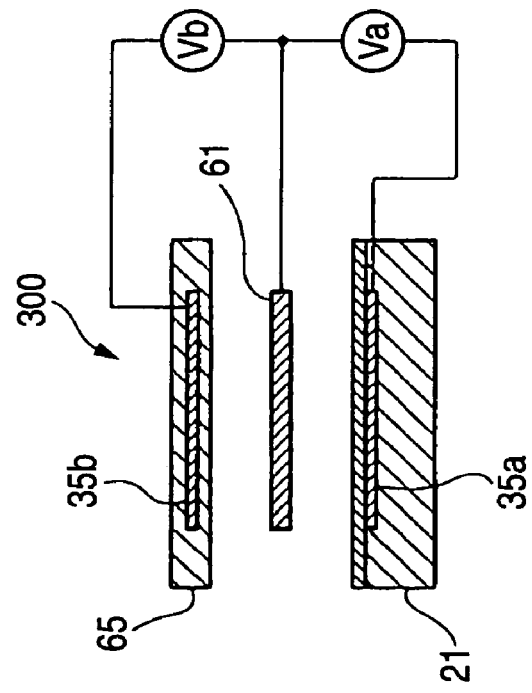
FIGS. 21A and 21B illustrate conceptual views showing a third embodiment of a small thin film movable element according to the invention.
Figure 21A:
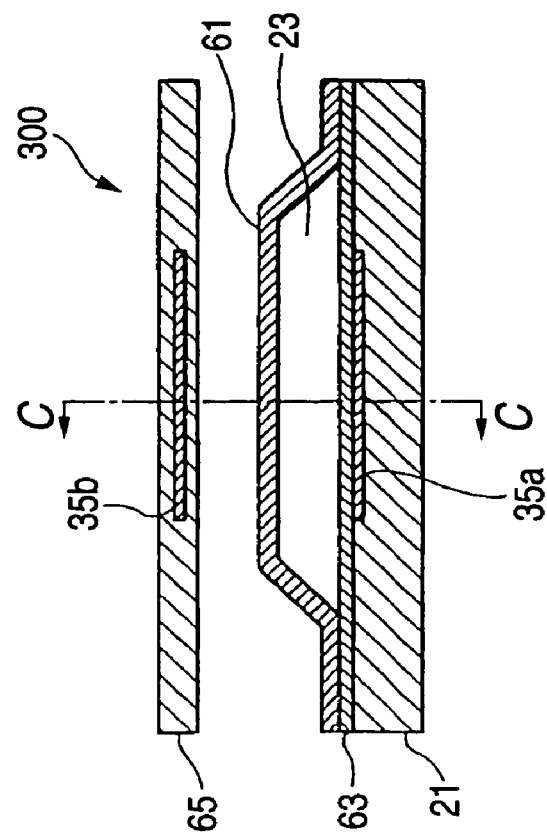

FIGS. 21A and 21B illustrate conceptual views showing a third embodiment of a small thin film movable element according to the invention.

A small thin film movable element 300 according to the embodiment is an element of a so-to-speak parallel flat plate type, and both ends of a movable portion 61 in a flat plate shape having a conductivity and a flexibility are fixed to an insulating film 63 formed on the board 21 by way of the predetermined gap 23. A lower side of the movable portion 61 of the board 21 is arranged with the first address electrode 35a by way of the insulating film 63, further, an upper side of the movable portion 61 is arranged with the second address electrode 35b by way of an insulating film 65. That is, the movable portion 61 is constituted by a shape of a both support beam both ends of which are supported between the first address electrode 35a and the second address electrode 35b.

Also in the small thin film movable element 300 of the parallel flat plate type, the voltage Va, Vb applied between the first address electrode 35a and the movable portion 61, or between the second address electrode 35b and the movable portion 61 falls in a range equal to or lower than the static pull-in voltage and equal to or higher than the minimum dynamic pull-in voltage and therefore, the necessary minimum electrostatic force can be operated to the movable portion 61 without generating an excessive electrostatic force generated by applying a voltage larger than the static pull-in voltage. Therefore, the vibration generated in pull-in can be reduced and the small thin film movable element 300 can be operated at high speed by considerably shortening a time period until converging the vibration.

Next, a fourth embodiment of a small thin film movable element according to the invention will be explained.

Figure 22:
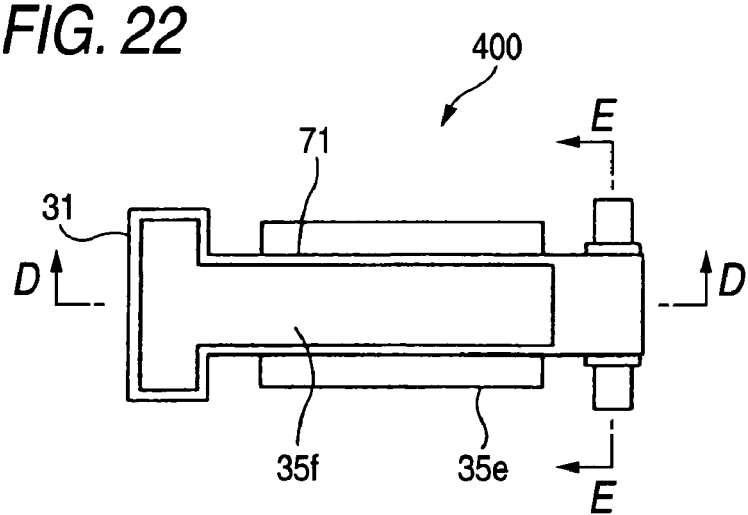
FIG. 22 is a plane view showing a fourth embodiment of applying a small thin film movable element according to the invention to an RF switch.
Figure 23A:
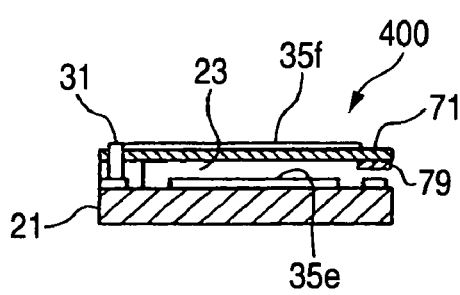
FIG. 23A illustrates an explanatory view showing a D-D section in an OFF state of the RF switch shown in FIG. 22.
Figure 23B:
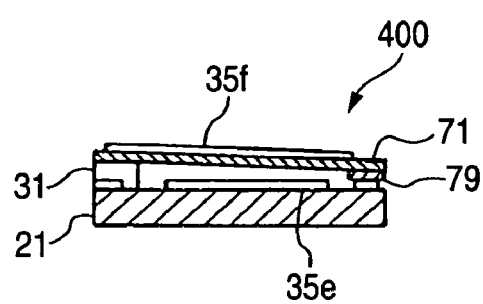
FIG. 23B illustrates an explanatory view showing the D-D section in an ON state of the RF switch shown in FIG. 22.
Figure 24A:
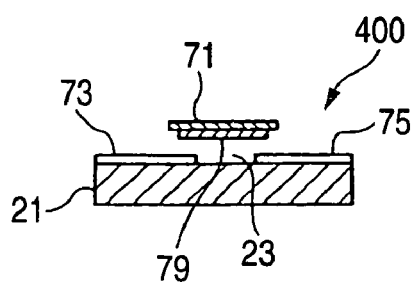
FIG. 24A illustrates an explanatory view showing an E-E section in the OFF state of the RF switch shown in FIG. 22.
Figure 24B:
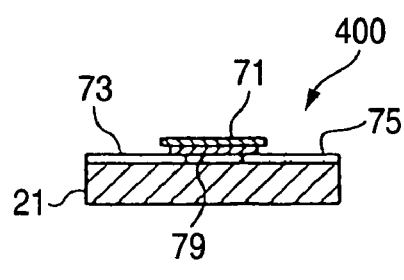
FIG. 24B illustrates an explanatory view showing the E-E section in the ON state of the RF switch shown in FIG. 22.

FIG. 22 is a plane view showing a fourth embodiment of applying a small thin film movable element according to the invention to an RF switch, FIG. 23A illustrates an explanatory views showing a D-D section in an OFF state of the RF switch shown in FIG. 22 and FIG. 23B illustrates an explanatory views showing a D-D section in an ON state thereof, FIG. 24A illustrates explanatory views showing an E-E section in the OFF state of the RF switch shown in FIG. 22 and FIG. 24B illustrates explanatory views showing an E-E section in the ON state.

The small thin film according to the invention is applicable to an RF switch 400 which is not provided with a micromirror portion by a basic constitution thereof. The RF switch 400 constitutes an RF (radio frequency) switch of a cantilever type. That is, the RF switch 400 includes a cantilever 71 constituting a movable portion arranged in parallel with the board 21 by way of the gap 23, the spacer 31 supporting a base end of the cantilever 71 by the board 21, a first electrode 35e and a second electrode 35f, an input terminal 73, an output terminal 75, and a shortcircuit contact 79.

By such a constitution, by applying a voltage between the first electrode 35e and the second electrode 35f, the cantilever 71 is elastically deformed by the electrostatic force in an up and down direction to realize the RF switch for connecting and switching an RF (high frequency) signal by opening and closing the input terminal 73 and the output terminal 75. The RF switch 400 is made to be able to switch, for example, signal paths of a low frequency and a high frequency in transmitting/receiving signals by a single switch. Further, a closed circuit can be formed by connecting contacts constituted by two of the input terminals 73, the output terminal 75 by using a single mechanical element. Thereby, both of a series connection mode of connecting signal paths and a shortcircuit mode of groundling the signal paths can be realized.

Here, when the constitution of the small thin film movable element according to the invention is applied to a switch, a router, and an RF signal processing, a function more excellent than that in the case of using a normal electronic part can be realized. That is, the vibration of the movable portion can actively be reduced and therefore, a switch operation can be constituted by high speed. Further, transmission loss can be reduced and insulating performance in an OFF state can be promoted. When applied to an inductor or a capacitor, a tuning circuit having a Q value far higher than that in the case of being formed by using a normal semiconductor process can be realized. When a band pass filter or a phase shifter is constituted thereby, a function of a level higher than that of an SAW element which has not been realized can be achieved. When a variable capacitance capacitor is constituted thereby, a circuit having a tuning characteristic more near to ideal than a varactor diode can be realized. Further, insulating performance in an OFF state is as high as 40 dB or higher at normal, insertion loss in an ON state can be made to be one severalth of 1 dB, different from a diode, or an FET switch, a substantially ideal RF characteristic can be achieved.

Respectives of the small thin film movable elements 100, 200, 300, 400 disclosed in the above-described respective embodiments can constitute a small thin film movable element array by being aligned one-dimensionally or two-dimensionally.

According to the small thin film movable element array, the small thin film movable elements 100, 200, 300, 400 capable of executing a high speed switching operation are arrayed, a time period of converging the vibration can be shortened, and the address voltage can be written faster than in the background art.

That is, high speed operation of a total of the array can be carried out by reducing the vibration by operating the individual small thin film movable elements by a necessary minimum electrostatic force. Thereby, for example, a photosensitive member can be exposed at high speed, or a projector display having a larger number of pixels or the like can be carried out. Further, although, for example, in an optical switch array for an optical communication, high accuracy is requested and therefore, an operational error caused by a variation in the individual elements needs to be corrected, according to the small thin film movable element array, the operational error can easily be corrected by changing voltages applied to the individual small thin film movable elements in correspondence with the correction.

Further, the high accuracy is requested for the small thin film movable element array for optical communication and therefore, the operational error caused by the variation in the individual elements needs to be connected. Therefore, in the small thin film movable element array, the correction needs to be carried out for respective elements. In contrast thereto, according to the small thin film movable element array according to the embodiment, the operational error can easily be corrected by changing the applied voltages of the individual small thin film movable elements 100, 200, 300, 400 in correspondence with the correction.

Figure 25A:
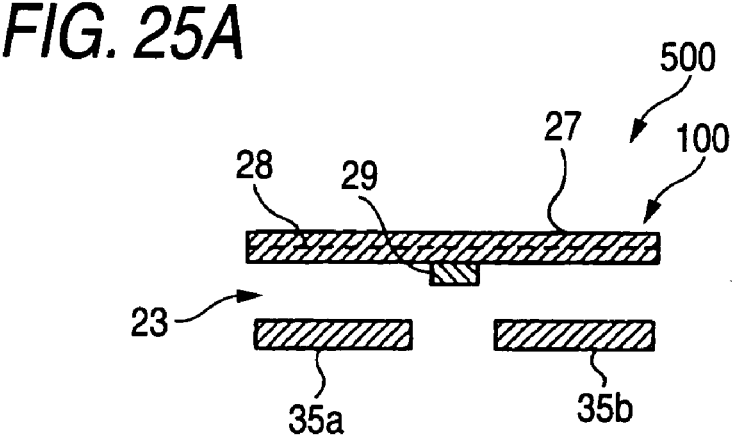
FIGS. 25A to 25C illustrates explanatory views of operation showing a procedure of a driving method of a small thin film movable element array.
Figure 25B:
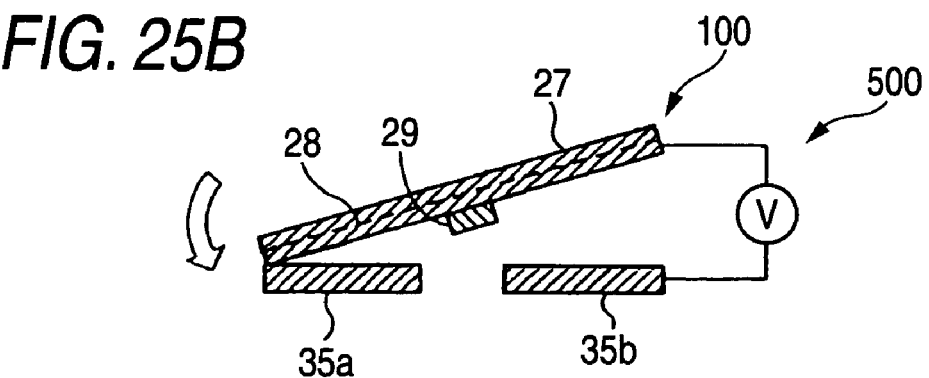
Figure 25C:
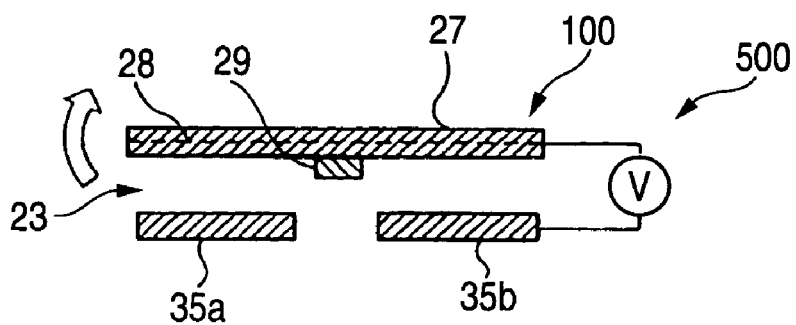

FIGS. 25A to 25C illustrate explanatory views of operation showing a procedure of a driving method in a small thin film movable element array.

According to a small thin film movable element array 500, the movable portions 27 of all of, for example, the small thin film movable elements 100 aligned are uniformly attracted to the fixed electrodes (for example, the first address electrodes 35a) as shown by FIG. 25B from a balanced state shown in FIG. 25A, thereafter, the individual small thin film movable elements 100 can arbitrarily operated. According to the method of driving the small thin film movable element array 500, a variation in displacements of the movable portions 27 by an individual difference of the individual elements 100 produced when the voltage is not applied can be removed.

Therefore, according to the method of driving the small thin film movable element array 500, the variation in the displacements of the movable portions 27 by the individual difference of the individual elements 100 produced when the voltage is not applied can be removed and a uniform control from a state without the variation can be carried out. As a result, operational errors of the individual small thin film movable elements 100 can be eliminated, and all of the small thin film movable elements 100 aligned can uniformly be operated.

Figure 26:
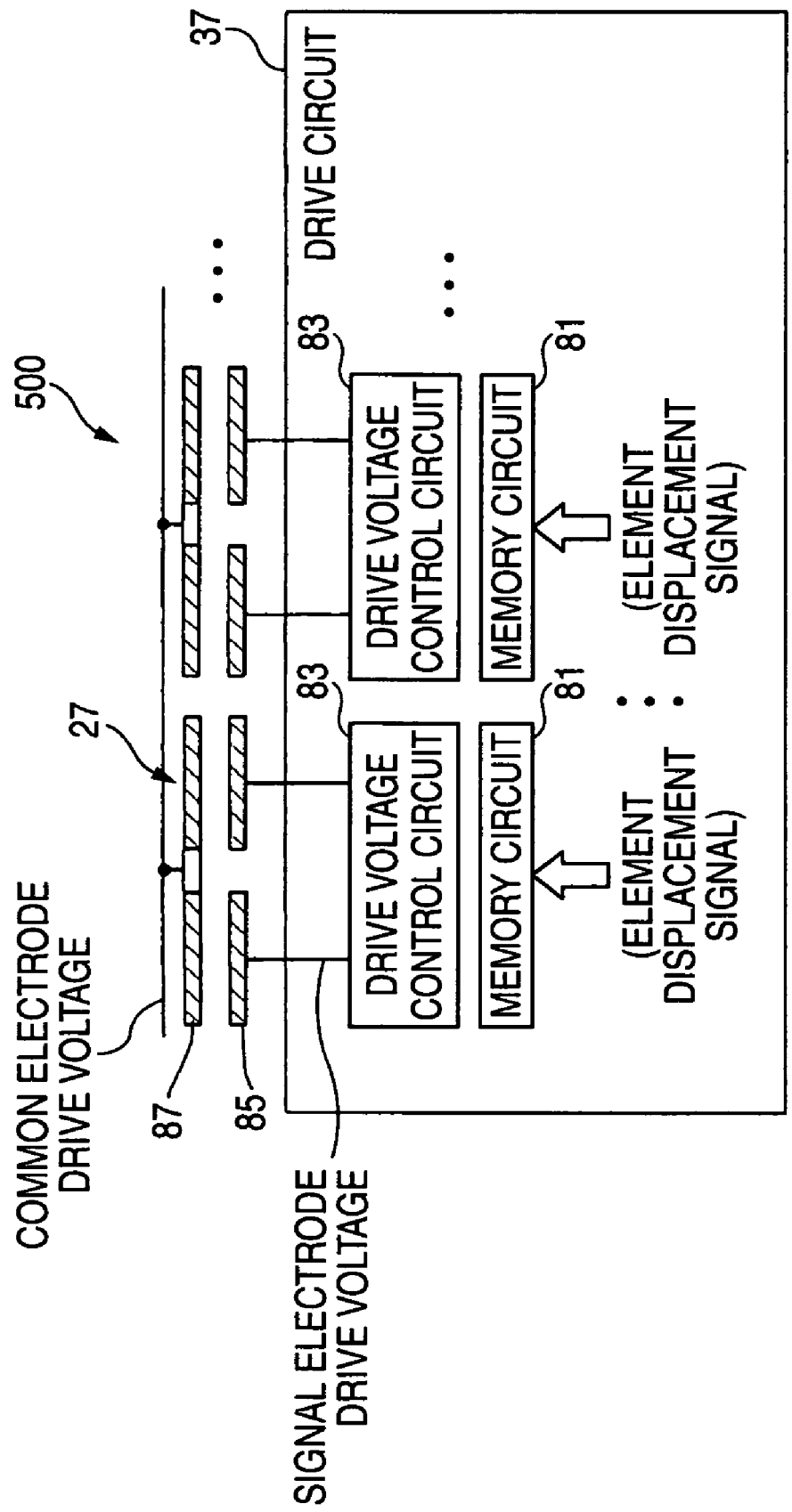
FIG. 26 is an explanatory view showing a constitution in which each of small thin film movable elements includes a drive circuit including a memory circuit.

FIG. 26 is an explanatory view showing a constitution in which each of small thin film movable elements includes a drive circuit including a memory circuit.

According to the small thin film movable element array 500, it is preferable that each of the small thin film movable elements 100 includes the drive circuit 37 (refer to FIG. 1) including a memory circuit 81. By providing the memory circuit 81, an element displacement signal can be written previously to the memory circuit 81. That is, the memory circuit 81 is previously written with the element displacement signal. In switching the small thin film movable element 100, by the element displacement signal stored to the memory circuit 81 of each of the small thin film movable element 100 and a drive voltage control circuit 83 for controlling a voltage applied to the small thin film movable element b100, a drive voltage of the invention is outputted to the signal electrode (first address electrode, second address electrode) 85 of the small thin film movable element 100. At this occasion, a desired voltage is outputted also to a common electrode (movable element) 87.

When the small thin film movable element 100 is driven by using the memory circuit 81, each of the plurality of small thin film movable elements 100 can easily be operated by an arbitrary drive pattern, and can actively be driven by faster speed. Further, also here, the constitution of the small thin film movable element 100 of FIG. 1 is shown, the invention is not limited thereto but can be applied to the small thin film movable elements 200, 300, 400 having other constitutions.

It is preferable that the small thin film movable element array 500 is provided with the control circuit 83 as a control portion for driving to switch each of the movable portions 27.

According to the small thin film movable element array 500 having the control circuit 83, by controlling to drive the movable portion 27 by the control circuit 83, a vibration generated in pull-in can be reduced, as a result, the movable portion 27 can be operated at high speed by considerably shortening the time period until converging the vibration.

Figure 27:
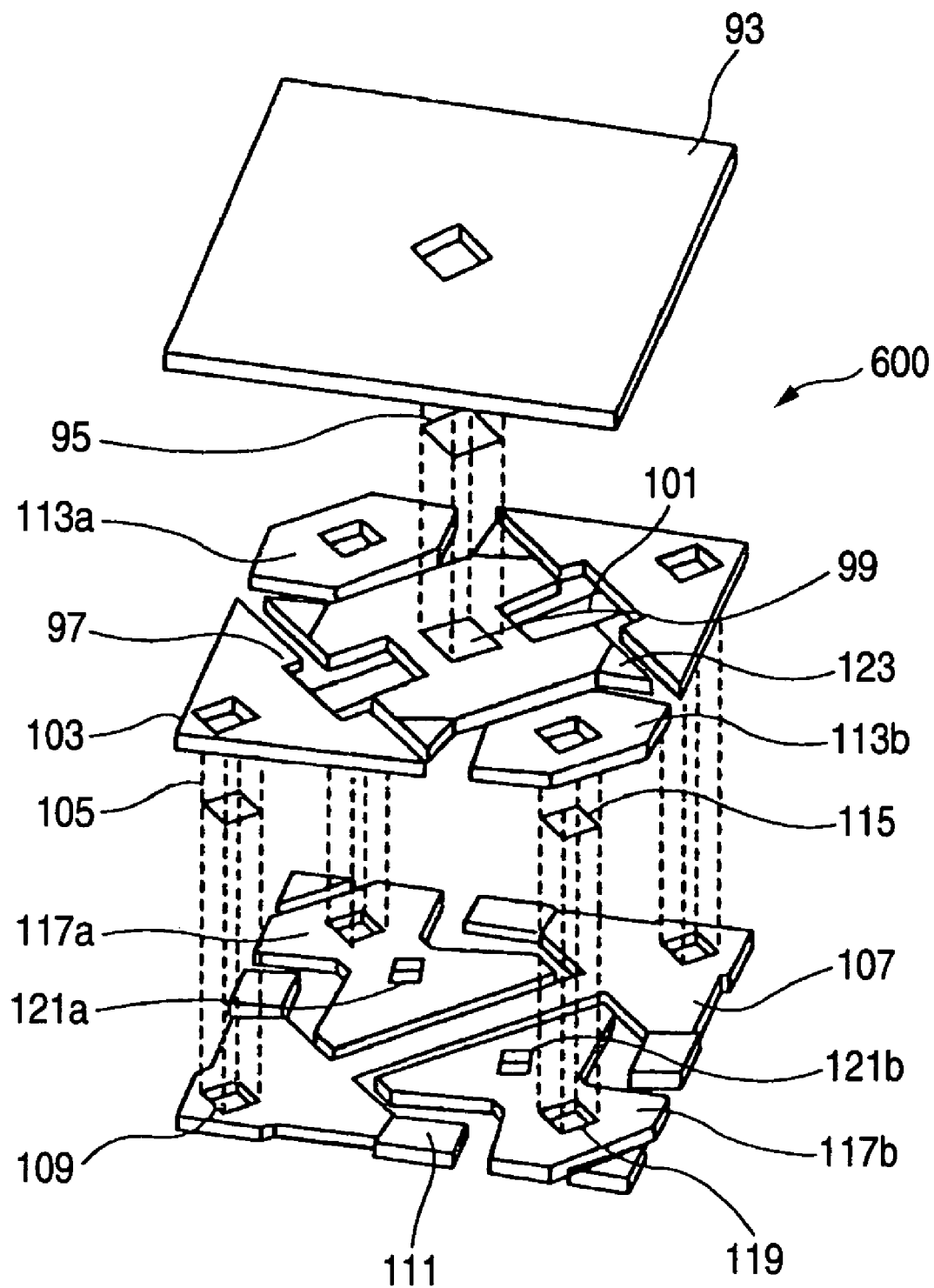
FIG. 27 is a disassembled perspective view of DMD constituted by using a small thin film movable element according to the invention.

FIG. 27 is a disassembled perspective view of DMD constituted by using the small thin film-movable element according to the invention.

The small thin film movable element according to the invention is applicable to DMD 600 shown in FIG. 27. In the drawing, numeral 93 designates a micromirror which is connected to a support post connecting portion 99 of a yoke 97 by a micromirror support post 95. The yoke 97 is held by a hinge 101. Further, the hinge 101 is held by a post cap 103. The post cap 103 is connected to a hinge support post connecting portion 109 of a common bus 107 by a hinge support post 105. That is, the micromirror 93 is connected to the common bus 107 by way of the hinge 101, the post cap 103 and the hinge support post 105. The micromirror 93 is supplied with a common voltage by way of the common bus 107. The common bus 107 includes a grounding site 111 constituting a stopping member. The grounding site 111 is provided with insulating performance or maintained at a potential the same as that of the micromirror 93.

Notation 113a designates one fixed electrode (first address electrode) and notation 113b designates other fixed electrode (second address electrode). The first address electrode 113a is connected to an electrode support post connecting portion 119 of a first address electrode pad 117a by an electrode support post 115. Further, also the second address electrode 113b is connected to the electrode support post connecting portion 119 of a second address electrode pad 117b by the electrode support post 115.

A digital signal inputted from a first connecting portion 121a to the first address electrode pad 117a is inputted to the first address electrode 113a. A digital signal inputted from a second connecting portion 121b to the second address electrode pad 117b is inputted to the second address electrode 113b. By inputting the digital signals to the first address electrode 113a and the second address electrode 113b, the micromirror 93 is inclined to select white display or black display. By inclining the micromirror 93, a portion of a yoke piece 123 may be brought into contact with the grounding site 111.

Even in DMD 600 having such a constitution, the voltage applied between the first address electrode 113a and the yoke piece 123, or between the second address electrode 113b and the yoke piece 123 falls in a range equal to or lower than the static pull-in voltage and equal to or higher than the minimum dynamic pull-in voltage and therefore, an excessive electrostatic force generated by applying a voltage larger than the static pull-in voltage is not generated and a necessary minimum electrostatic force can be operated to the yoke piece 123. Therefore, the vibration generated in pull-in can be reduced. As a result, DMD 600 can be operated at high speed by considerably shortening a time period until converging the vibration.

Figure 28:
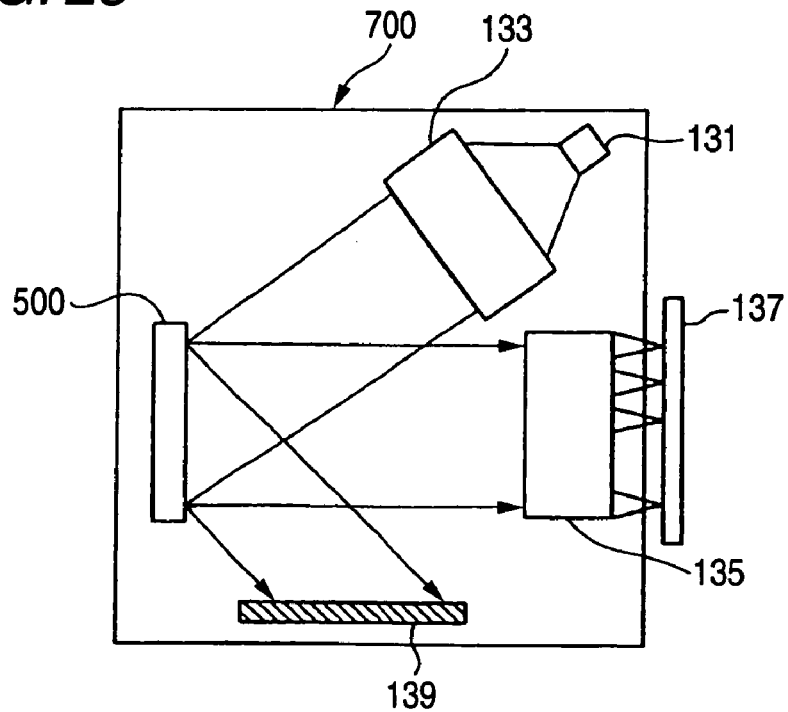
FIG. 28 is a view showing an outline constitution of an exposing apparatus constituted by using a small thin film movable element array according to the invention.

Next, an explanation will be given of an image forming apparatus constituted by using the small thin film movable element 100. Here, as an example of the image forming apparatus, first, an exposing apparatus 700 will be explained. FIG. 28 is a view showing an outline constitution of an exposing apparatus constituted by using the small thin film movable element array according to the invention. The exposing apparatus 700 includes an illuminating light source 131, an illuminating optical system 133, the small thin film movable element array 500 two-dimensionally aligned with a plurality of the small thin film movable elements 100 according to the above-described embodiment on the same plane and a projecting optical system 135.

The illuminating light source 131 is a light source of a laser, a high pressure mercury lamp, a short arc lamp or the like. The illuminating optical system 133 is constituted by, for example, a collimating lens for making light in a face-like shape emitted from the illuminating light source 131 parallel light. Parallel light transmitted through the collimating lens is orthogonally incident on the respective small thin film movable elements 100 of the small thin film movable element array 500. As means for constituting parallel light by light in the face-like shape emitted from the illuminating light source 131, other than the collimating lens, there is a method of arranging two of microlenses in series. Further, by using a short arc lamp or the like having a small light emitting point as the illuminating light source 131, the illuminating light source 131 may be regarded as a point light source and parallel light may be incident on the small thin film movable element array 500. Further, by using an LED array having LED in correspondence with each of the small thin film movable elements 100 of the small thin film movable element array 500 as the illuminating light source 131 and emitting light by making the LED array and the small thin film movable element array 500 proximate to each other, parallel light may be incident on each of the small thin film movable elements 100 of the small thin film movable element array 500. Further, when a laser is used as the illuminating light source 131, the illuminating optical system 133 may be omitted.

The projecting optical system 135 is for projecting light to a record medium 137 constituting an image forming face, and is, for example, a microlens array having microlenses in correspondence with the respective small thin film movable elements 100 of the small thin film movable element array 500 or the like.

Operation of the exposing apparatus 700 will be explained as follows.

Light in the face-like shape emitted from the illuminating light source 131 is incident on the illuminating optical system 133, and light made to be parallel light thereby is incident on the small thin film movable element array 500. Light incident on each of the small thin film movable elements 100 of the small thin film movable element array 500 is controlled to be reflected in accordance with the image signal. An image of light emitted from the small thin film movable element array 500 is taken to be exposed on the image forming face of the record medium 137 by the projecting optical system 135. Image taking light is projected to be exposed while being moved in a scanning direction relative to the record medium 137 and can expose a wide area by high resolution. In this way, by providing the collimating lens on a side of the incident face of light of the small thin film movable element array 500, light incident on a plane board of respective modulating elements can be constituted by parallel light. Further, numeral 139 in the drawing designates an optical absorber for introducing OFF light.

The exposing apparatus 700 is not limited to using the collimating lens as the illuminating optical system 133 but can be constituted by using a microlens array. In this case, the respective microlenses of the microlens array correspond to the respective small thin film movable elements 100 of the small thin film movable element array 500 and designed and adjusted such that optical axes and focal faces of the microlenses are aligned to centers of the respective optical modulating elements.

In this case, incident light from the illuminating light source 131 is converged to a region having an area smaller than one element of the small thin film movable element 100 and is incident on the small thin film movable element array 500 by the microlens array. Light incident on each of the small thin film movable elements 100 of the small thin film movable element array 500 is controlled to be reflected in accordance with the inputted image signal. Light emitted from the small thin film movable element array 500 is projected to be exposed to the image forming face of the record medium 137 by the projecting optical system 135. Projected light is projected to be exposed while being moved in the scanning direction relative to the record medium 137 and can expose a wide area by high resolution. In this way, light from the illuminating light source 131 can be converged by the microlens array and therefore, the exposing apparatus promoting light utilizing efficiency can be realized.

Further, a shape of a lens face of the microlens is not particularly limited and may be a spherical face, a semispherical face or the like and may be a projected curved face or a recessed curved face. Further, the microlens array may be a microlens array having a flat shape having a refractive index distribution and may be arrayed with a Fresnel lens or a diffractive type lens by binary optics or the like. A material of the microlens is constituted by, for example, transparent glass or resin. From a view point of mass production performance, resin is excellent, from a view point of service life, reliability, glass is excellent. From an optical view point, quartz glass, melted silica, alkaliless glass or the like is preferable as glass, acrylic species, epoxy species, polyester species, polycarbonate species, styrene species, vinyl chloride species or the like is preferable as resin. Further, as resin, there is a photocurrying type, a thermoplastic type or the like, which is preferably selected pertinently in accordance with a method of fabricating a microlens.

Next, a projecting apparatus will be explained as other example of the image forming apparatus.

Figure 29:
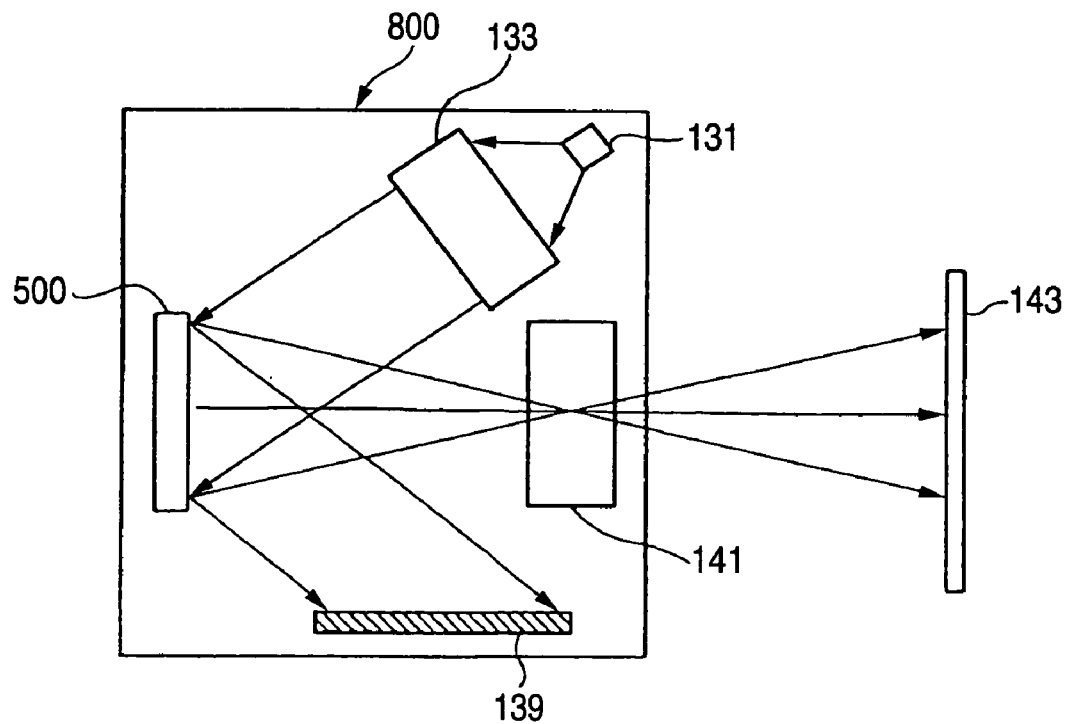
FIG. 29 is a view showing an outline constitution of a projecting apparatus constituted by using a small thin film movable element array according to the invention.

FIG. 29 is a view showing an outline constitution of a projecting apparatus constituted by using the small thin film movable element array according to the invention. Constitutions similar to those of FIG. 28 are attached with the same notations and an explanation thereof will be omitted.

A projector 800 as a projecting apparatus includes the illuminating light source 131, the illuminating optical system 133, the small thin film movable element array 500, and a projecting optical system 141. The projecting optical system 141 is an optical system for a projecting apparatus for projecting light to a screen 143 constituting the image forming face. The illuminating optical system 133 may be the collimator lens, or may be a microlens array.

Next, operation of the projector 800 will be explained.

Incident light from the illuminating light source 131 is converged to a region having an area smaller than that of one element of the small thin film movable element 100 by, for example, a microlens array and is incident on the small thin film movable element array 500. Light incident on each of the small thin film movable elements 100 of the small thin film movable element array 500 is controlled to be reflected in accordance with the image signal. Light emitted from the small thin film movable element array 500 is projected to be exposed to the image forming face of the screen 143 of the projecting optical system 141. In this way, the small thin film movable element array 500 can be utilized for the projecting apparatus and is applicable also to a display apparatus.

Therefore, according to the image forming apparatus of the exposing apparatus 700, the projector 800 or the like, by providing the small thin film movable element array 500 to an essential portion of the constitution, an excessive electrostatic force produced by applying a voltage larger than the static pull-in voltage is not generated at each of the small thin film movable elements 100, and a necessary minimum electrostatic force can be operated to the movable portion 27. Therefore, the vibration generated in pull-in can be reduced. As a result, by considerably shortening the time period until converging the vibration, a photosensitive member can be exposed at high speed, or a display of a projector having a larger number of pixels can be carried out. Further, in the image forming apparatus (exposing apparatus 700) in which a gray scale is controlled by ON/OFF of exposing light, a higher gray scale can be realized by enabling to shorten ON/OFF time. As a result, a photosensitive member can be exposed at high speed, or a display can be carried out by a projector having a larger number of pixels.

Figure 30:
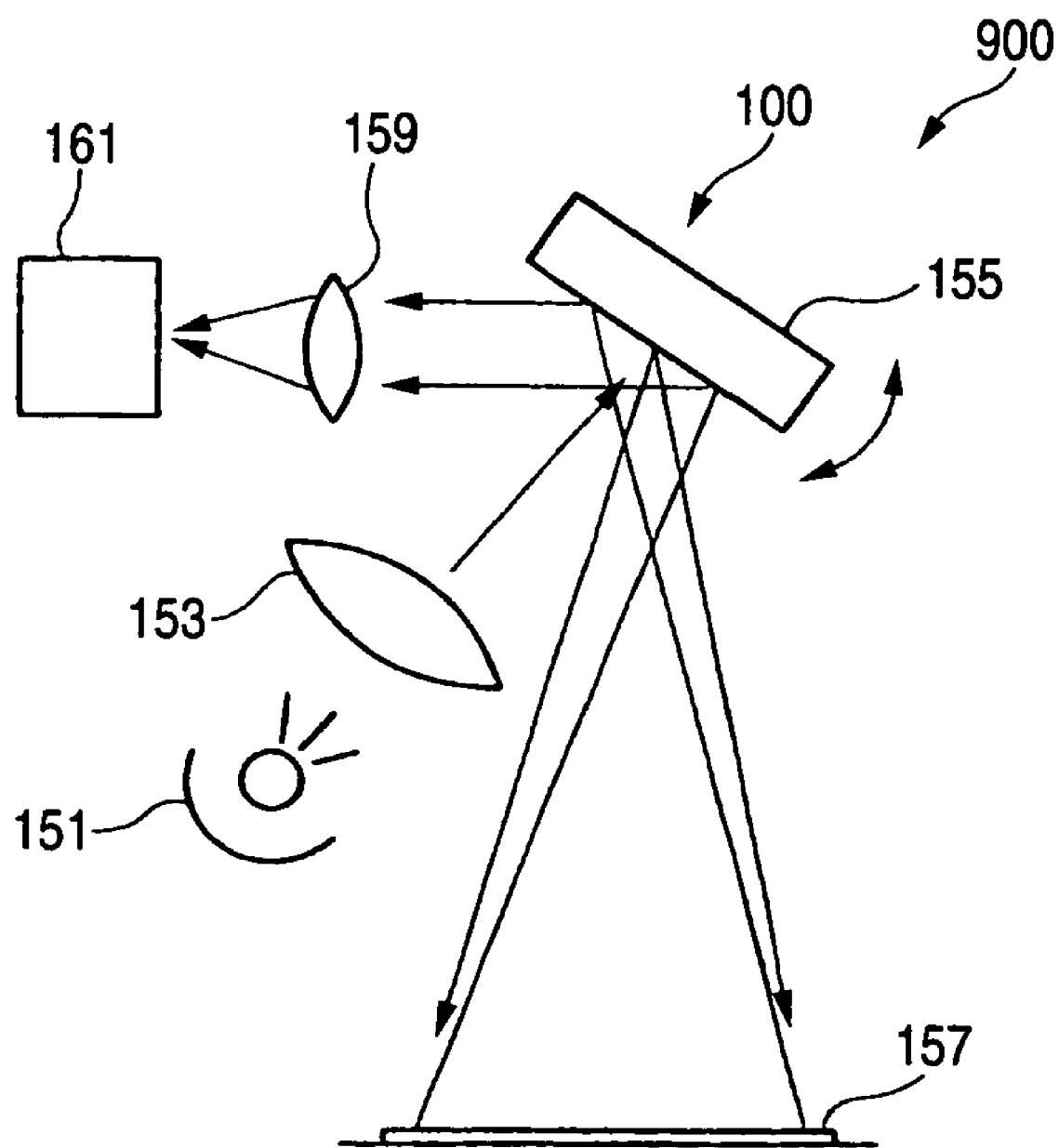
FIG. 30 is a view showing an outline constitution of a scanner constituted by using a small thin film movable element array according to the invention.

FIG. 30 is a view showing an outline constitution of a scanner constituted by using the small thin film movable element array according to the invention.

The small thin film movable element array according to the invention can preferably be used for a beam scanner or the like for scanning light ray emitted from a light emitting element to an irradiated object and reflecting light returned from the irradiated object to be incident on a light receiving element. A scanner 900 narrows light from a light source 151 by a lens 153, reflects the light by a scan mirror 155 constituting the movable portion of the small thin film movable element 100 to irradiate to a bar code 157. The scan mirror is pivoted in order to irradiate light over an entire region of light. In pivoting, the movable portion is pivoted to displace by constituting a center of twist by a hinge by applying voltages to a first electrode, a second electrode, a movable portion, not illustrated. That is, by constituting the movable portion by the scan mirror 155, a direction of reflecting light is switched.

On the other hand, light irradiated to a face of the bar code 157 is returned again to the scan mirror 155 while being reflected randomly with a change in a light amount by black and white of the bar code, light reflected thereby is converged by a converging lens 159 and a change in the light amount is electrically converted to be outputted by a light receiving element 161. Further, in order to promote accuracy of reading, a band pass filter (BPF) is provided at a front face of the light receiving element 161 to prevent unnecessary light other than light of emitted light frequency from being adopted.

Also in the scanner using the small thin film movable element 100, a voltage for driving to displace the movable portion falls in a range equal to or smaller than the static pull-in voltage and equal to or larger than the minimum dynamic pull-in voltage. That is, an equation of static pull-in voltage$\geq$drive voltage$\geq$minimum dynamic pull-in voltage is satisfied. By setting the drive voltage in such a range, an electrostatic force more than necessary is prevented from being brought about and the vibration of the movable portion in pull-in is reduced. As a result, the scan mirror 155 can be pivoted at high speed.

Figure 31:
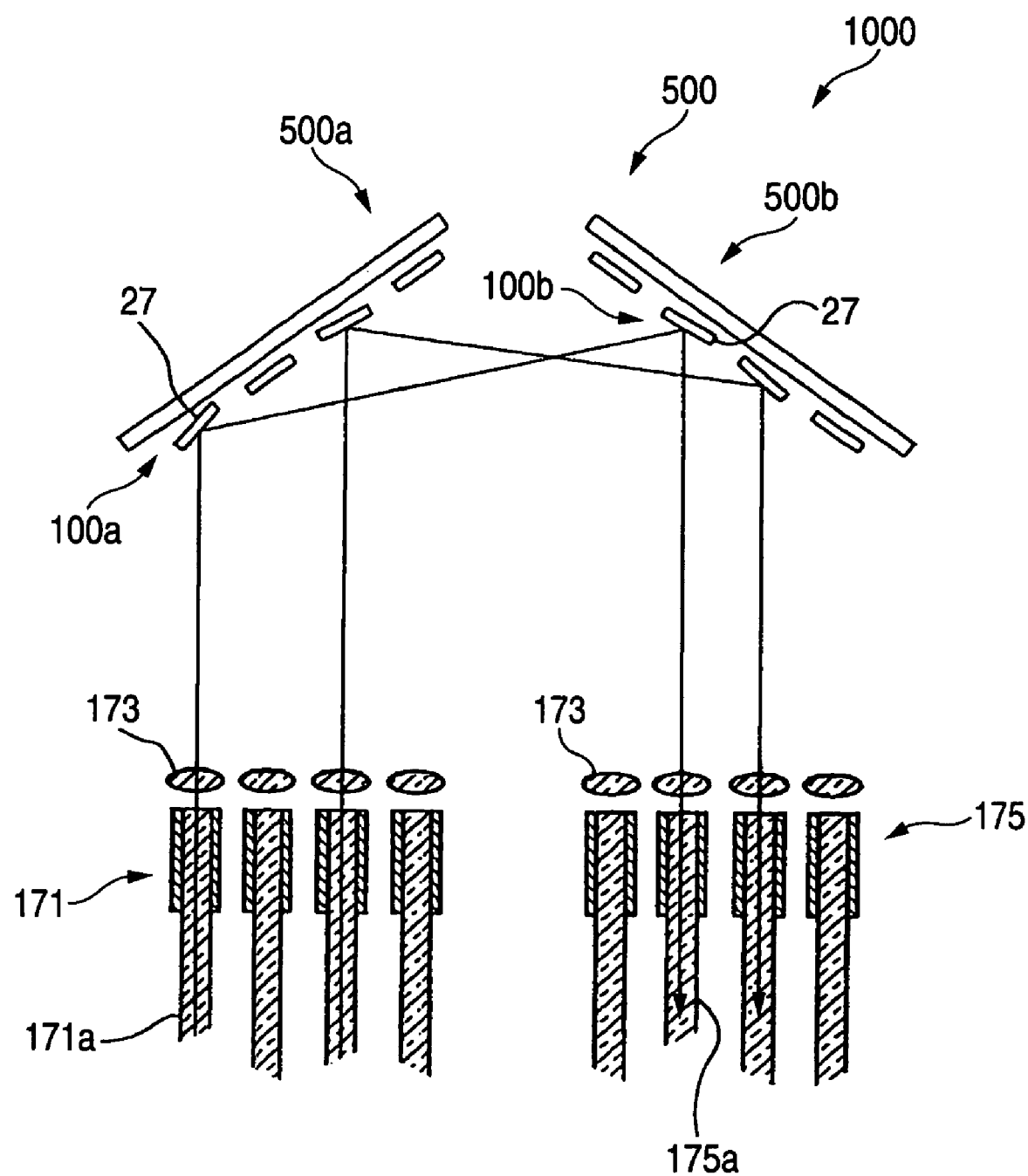
FIG. 31 is an explanatory view showing a constitution of a cross connect switch using a small thin film movable element according to the invention.
Figure 32A:
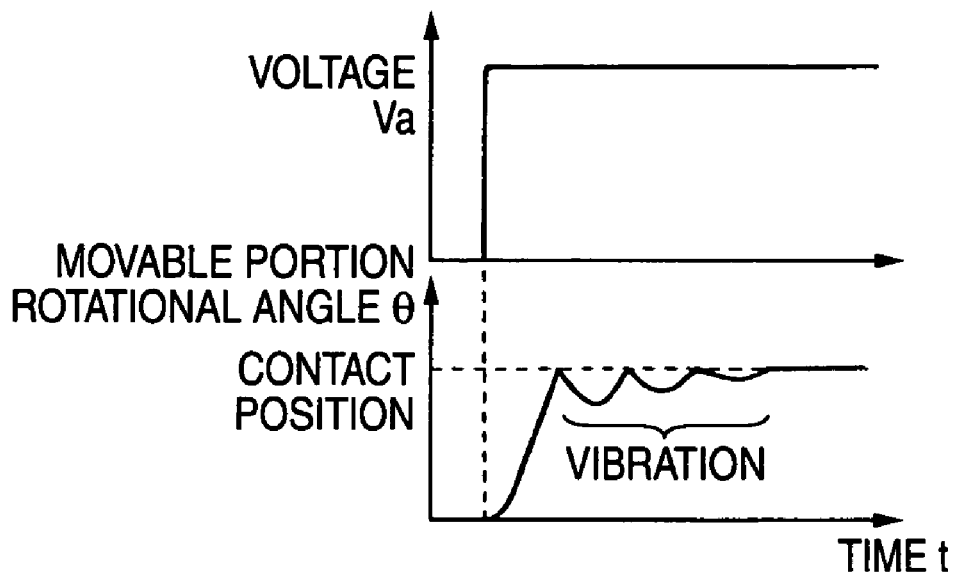
FIG. 32 illustrates explanatory diagrams showing a vibration of a movable portion generated at an optical switch of a background art.
Figure 32B:
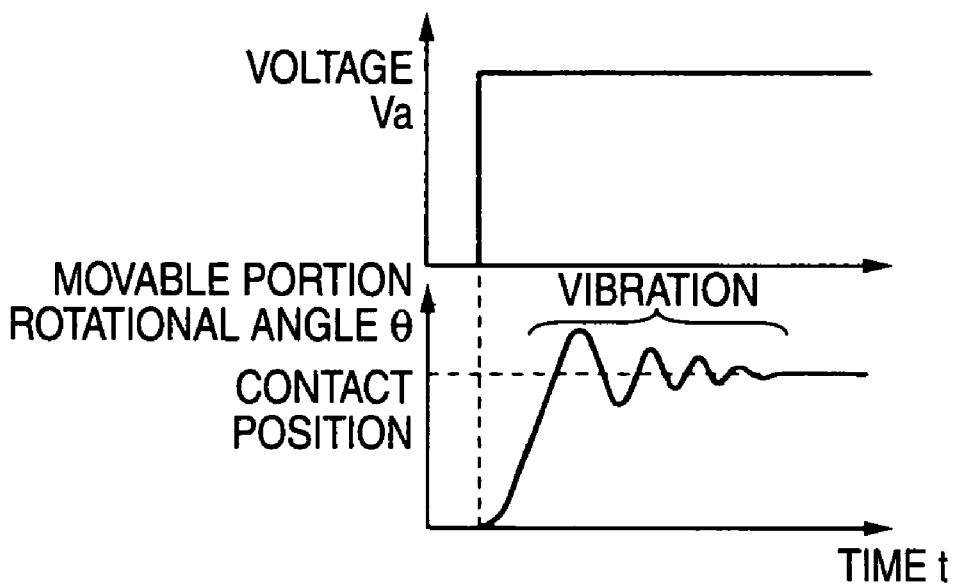

FIG. 31 is an explanatory view showing a constitution of a cross connect switch using a small thin film movable element.

Further, the small thin film movable element array according to the invention can preferably be used for a cross connect switch of optical communication or the like.

The cross connect switch 1000 can be constituted by using, for example, the small thin film movable element array 500 one-dimensionally aligned with the small thin film movable elements 100. In an illustrated example, two of small thin film movable element arrays 500a, 500b are provided. According to the cross connect switch 1000, light emitted from an optical fiber 171a of an input fiber port 171 passes a microlens 173 to be incident on a predetermined small thin film movable element 100a of the small thin film movable element array 500a on one side. Incident light constitutes a reflected light by operating to switch the small thin film movable element 100a to be incident on a desired small thin film movable element 100b of an incident side of the small thin film movable element array 500b. Incident light is incident on an optical fiber 175a of a predetermined output fiber port 175 by switching the small thin film movable element 100b.

Also in the cross connect switch 1000, by using the small thin film movable element array 500 comprising the plurality of the small thin film movable elements 100, an electrostatic force more than necessary is prevented from being generated at the movable portion (micromirror portion) 27 and the vibration of the movable portion 27 in pull-in is reduced. As a result, noise is reduced by reducing chattering and switching operation can be constituted by high speed.

Further, according to the cross connect switch 1000, by changing the applied voltages of the individual small thin film movable elements 100 as described above, the vibration generated at the respective small thin film movable elements 100 in pull-in can be reduced, as a result, the movable portion can be operated at high speed by considerably shortening the time period until converging the vibration.

Further, although according to the cross connect switch 1000, an explanation has been given by an example of using the small thin film movable element 100 which is pivoted monoaxially, the three-dimensional small thin film movable element 100A which is biaxially pivoted as shown in FIG. 19 may be used for the small thin film movable element array. By constituting in this way, for example, even in a case in which the optical fibers 171a of the input fiber ports 171 are one-dimensionally aligned and the optical fibers 175a of the output fiber ports 175 are two-dimensionally aligned, by three-dimensionally driving the movable portion 27, light emitted from the optical fiber 171a can be switched to the desired optical fiber 175a in a direction orthogonal to paper face.

The entire disclosure of each and every foreign patent application from which the benefit of foreign priority has been claimed in the present application is incorporated herein by reference, as if fully set forth.

What is claimed is:

1. A small thin film movable element comprising:
   a movable portion having a movable electrode; and
   a fixed electrode arranged to be opposed to the movable portion,
   wherein the movable portion is displaced by an electrostatic force in accordance with a voltage applied to the movable electrode and the fixed electrode, and
   wherein the voltage applied in displacing the movable portion falls in a range equal to or lower than a static pull-in voltage and equal to or higher than a minimum dynamic pull-in voltage of the movable portion.

2. The small thin film movable element according to claim 1, further comprising a board to which the fixed electrode is provided,
   wherein the movable electrode is provided to the movable portion in a shape of a thin film, the movable electrode being supported by the board by interposing a gap therebetween, and
   the movable portion is operated to be proximate to and remote from the board substantially in parallel with the board.

3. The small thin film movable element according to claim 1, further comprising a board to which the fixed electrode is provided,
   wherein the movable electrode is provided to the movable portion in a shape of a thin film, the movable portion being supported by the board by interposing a gap therebetween and by way of a support portion, and
   the movable portion is pivoted centering on the support portion.

4. The small thin film movable element according to claim 1,
   wherein the movable portion further comprises a reflecting face, and
   light incident on the reflecting face of the movable portion is modulated.

5. The small thin film movable element according to claim 1, further comprising a board to which the fixed electrode is provided, the board comprising an input terminal and an output terminal,
   wherein the movable portion further comprises a shortcircuit contact, and
   the shortcircuit contact of the movable portion connects and switches a high frequency signal by opening and closing the input terminal and the output terminal provided at the board.

6. A small thin film movable element array comprising small thin film movable elements which are one-dimensionally or two-dimensionally aligned, each of the small thin film movable elements being according to the small thin film movable element according to claim 1.

7. A method of driving a small thin film movable element array according to claim 6, the method comprising:
   attracting all of the movable portions of the aligned small thin film movable elements uniformly to the fixed electrodes by the electrostatic forces in accordance with the voltages; and
   arbitrarily operating the individual small thin film movable elements.

* * * * *